United States Patent
Kamoshida et al.

(10) Patent No.: US 10,613,465 B2
(45) Date of Patent: Apr. 7, 2020

(54) DRUM CYLINDER UNIT, METHOD FOR ATTACHING COUPLING MEMBER, AND DRUM UNIT

(71) Applicant: CANON KABUSHIKI KAISHA, Tokyo (JP)

(72) Inventors: Shigemi Kamoshida, Tokyo (JP); Ken Kikuchi, Mishima (JP); Jun Miyamoto, Mishima (JP); Tomonori Mori, Numazu (JP); Daisuke Abe, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/554,929

(22) PCT Filed: Mar. 8, 2016

(86) PCT No.: PCT/JP2016/001268
§ 371 (c)(1),
(2) Date: Aug. 31, 2017

(87) PCT Pub. No.: WO2016/143333
PCT Pub. Date: Sep. 15, 2016

(65) Prior Publication Data
US 2018/0087580 A1    Mar. 29, 2018

(30) Foreign Application Priority Data

Mar. 10, 2015 (JP) .................................. 2015-047603
Feb. 17, 2016 (JP) .................................. 2016-028430

(51) Int. Cl.
*G03G 15/00* (2006.01)
*G03G 21/18* (2006.01)
*G03G 21/16* (2006.01)

(52) U.S. Cl.
CPC ....... *G03G 15/757* (2013.01); *G03G 21/1647* (2013.01); *G03G 21/1671* (2013.01);
(Continued)

(58) Field of Classification Search
CPC ............... G03G 15/751; G03G 15/757; G03G 21/1647; G03G 21/1671; G03G 21/186;
(Continued)

(56) References Cited

U.S. PATENT DOCUMENTS 8,104,382 B2    1/2012 Hu
8,229,324 B2    7/2012 Takigawa et al.
(Continued)

FOREIGN PATENT DOCUMENTS

CN    103383534 A    11/2013
CN    104081291 A    10/2014
(Continued)

OTHER PUBLICATIONS

International Search Report and Written Opinion dated Apr. 12, 2016 in International Application No. PCT/JP2016/001268.
(Continued)

*Primary Examiner* — Joseph S Wong
(74) *Attorney, Agent, or Firm* — Venable LLP

(57) ABSTRACT

A drum cylinder unit includes a photoconductive drum and a flange member. The flange member includes a fixing portion fixed to an end of the photoconductive drum, a cylindrical portion which forms a hollow portion therein, a groove portion provided at an edge of the cylindrical portion, and a gear portion. The groove portion and the hollow portion open to an outside of an axial direction of the photoconductive drum.

4 Claims, 26 Drawing Sheets

(52) U.S. Cl.
CPC ......... *G03G 21/186* (2013.01); *G03G 15/751* (2013.01); *G03G 21/1853* (2013.01); *G03G 21/1857* (2013.01); *G03G 21/1871* (2013.01)

(58) Field of Classification Search
CPC .. G03G 21/1871; G03G 21/1857; F16D 3/20; F16D 3/2052; F16D 3/265; F16D 3/46; F16D 1/101
See application file for complete search history.

(56) References Cited

U.S. PATENT DOCUMENTS

| | | | |
|---|---|---|---|
| 8,280,278 | B2 | 10/2012 | Ueno et al. |
| 8,452,210 | B2 | 5/2013 | Ueno et al. |
| 8,676,085 | B1 | 3/2014 | Batori et al. |
| 9,268,303 | B2 | 2/2016 | Ikeda et al. |
| 9,395,679 | B2 | 7/2016 | Kawakami et al. |
| 9,400,484 | B2 | 7/2016 | Ikeda et al. |
| 2012/0294649 | A1* | 11/2012 | Kikuchi ............... G03G 15/757 399/117 |
| 2013/0071141 | A1 | 3/2013 | Ueno et al. |
| 2014/0165761 | A1 | 6/2014 | Ishio et al. |
| 2014/0270845 | A1 | 9/2014 | Kawakami et al. |
| 2016/0259290 | A1* | 9/2016 | Ikeda ................. G03G 15/757 |
| 2016/0306320 | A1 | 10/2016 | Kawakami et al. |

FOREIGN PATENT DOCUMENTS

| | | |
|---|---|---|
| JP | 2008-122552 | 5/2008 |
| JP | 2008-122552 A | 5/2008 |
| JP | 2008-233867 A | 10/2008 |
| JP | 3157067 U | 1/2010 |
| JP | 2011-095604 A | 5/2011 |
| JP | 2013-174653 | 9/2013 |
| JP | 2013-174653 A | 9/2013 |
| JP | 2014-112169 A | 6/2014 |
| JP | 2015-121776 A | 7/2015 |
| RU | 2510068 C2 | 3/2014 |
| TW | 201026975 A1 | 7/2010 |
| WO | 2013085073 A1 | 6/2013 |
| WO | 2015/005446 A1 | 1/2015 |
| WO | 2015005446 A1 | 1/2015 |
| WO | 2015/076276 A1 | 5/2015 |
| WO | WO-2015076276 A1 * | 5/2015 ........... G03G 15/757 |
| WO | 2016143912 A1 | 9/2016 |

OTHER PUBLICATIONS

Russian Office Action issued in corresponding Russian Application No. 2017135424/28(061790) dated Jun. 6, 2018.
Australian Office Action issued in corresponding AU Application No. 2016230559 dated Aug. 22, 2018.
Korean Office Action issued in corresponding Korean Application No. 10-2017-7027904 dated Aug. 29, 2018.
Columbian Office Action issued in corresponding Columbian Application No. NC2017/0010099 dated Aug. 1, 2018.
Office Action dated Mar. 2, 2017, in Taiwan Patent Application No. 10620238440.
Columbian Office Action issued in corresponding Columbian Application No. 201702251 dated Jan. 9, 2019.
Russian Office Action issued in corresponding Russian Application No. 2018129136 dated Apr. 1, 2019.
Korean Office Action issued in corresponding Korean Application No. 10-2017-7027904 dated May 27, 2019.
European Search Report issued in corresponding European Application No. 16761307.4 dated Feb. 13, 2019.
Canadian Office Action issued in corresponding Canadian Application No. 2977914 dated Jun. 7, 2019.
Chilean Office Action issued in corresponding Chilean Application No. 201702251 dated Aug. 13, 2019.
Australian Notice of Acceptance for Patent Application in corresponding Australian Application No. 2016230559 dated Aug. 30, 2019.
Korean Notice of Allowance or Notice of Acceptance issued in corresponding Korean Application No. 10-2017-7027904 dated Sep. 16, 2019.
Office Action issued in corresponding Chinese Application No. 201680014249.5, dated Oct. 30, 2019.
Office Action issued in corresponding Canadian Application No. 3,028,671, dated Nov. 21, 2019.
Office Action, dated Jan. 31, 2020, in corresponding Indian Application No. 201747034874.

* cited by examiner

FIG. 5A1
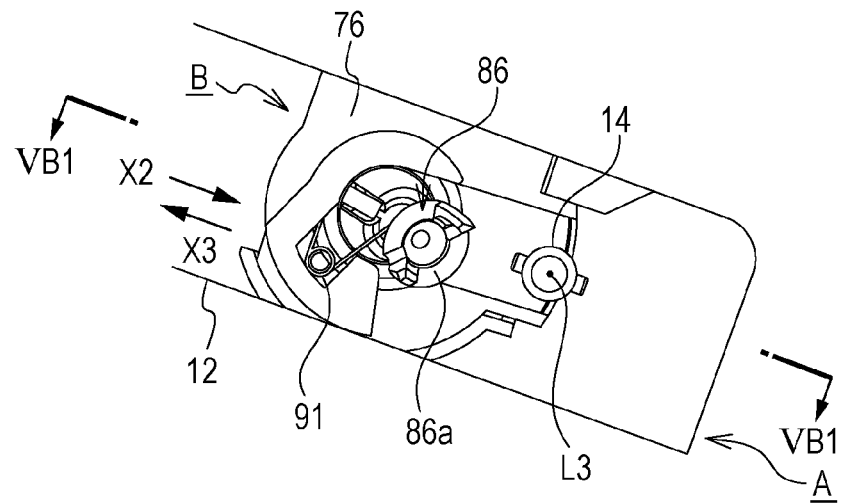
FIG. 5B1
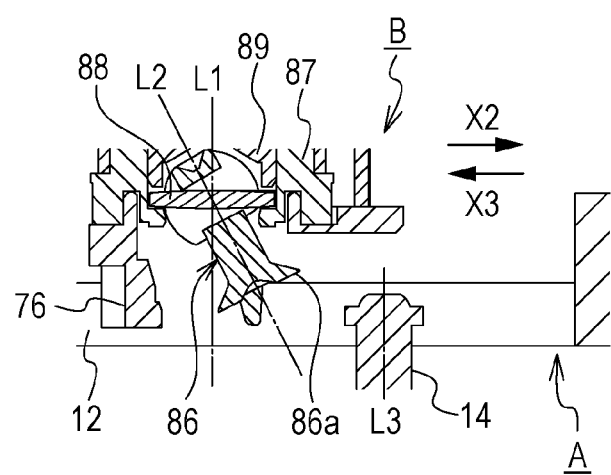

FIG. 5A2
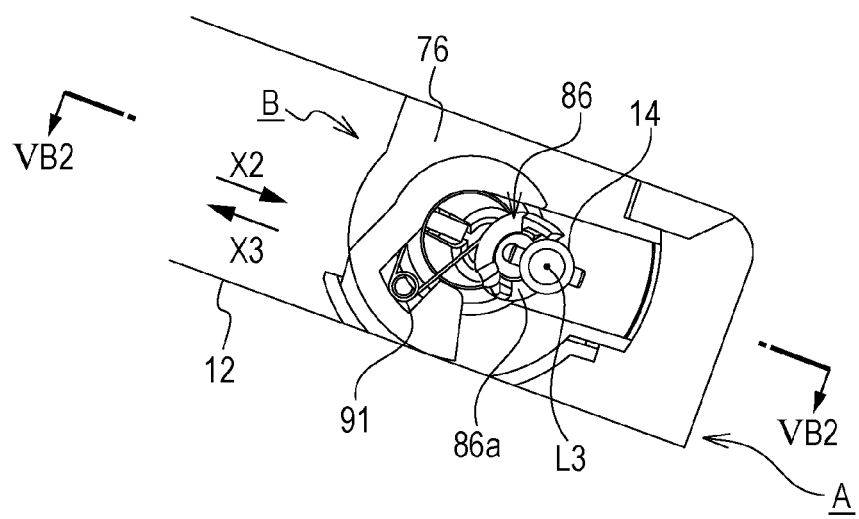
FIG. 5B2
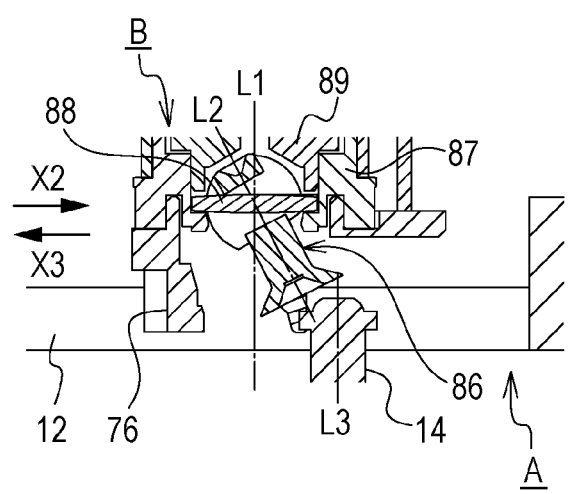

FIG. 5A3
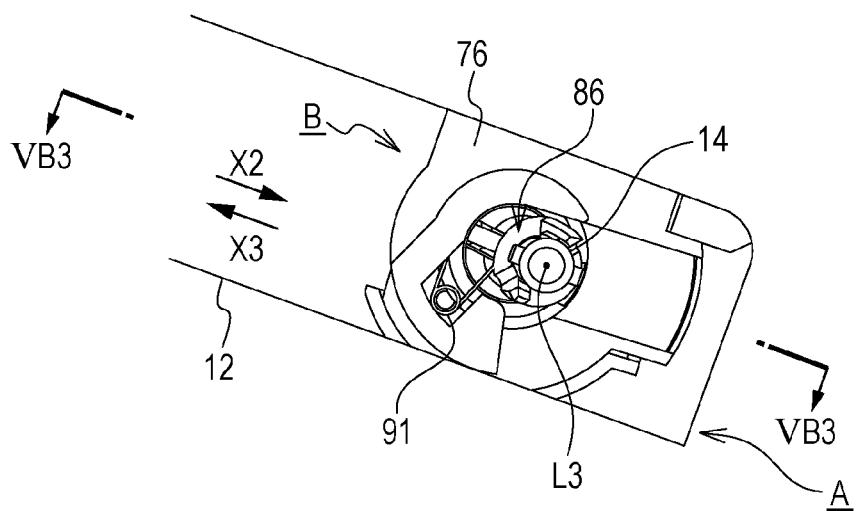
FIG. 5B3
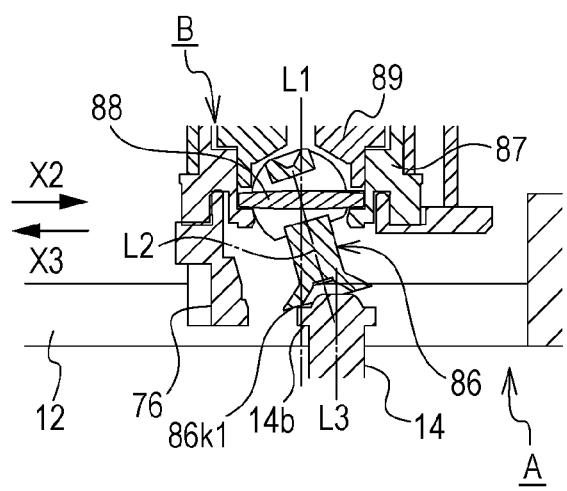

FIG. 5A4
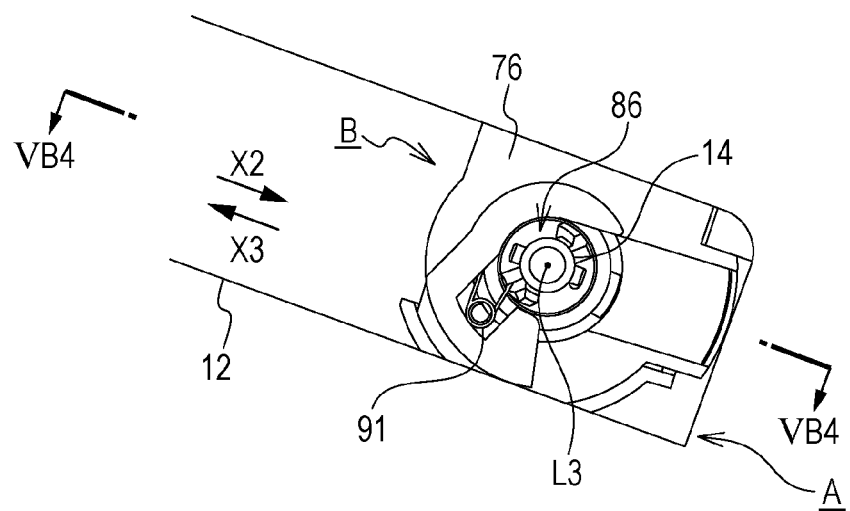
FIG. 5B4
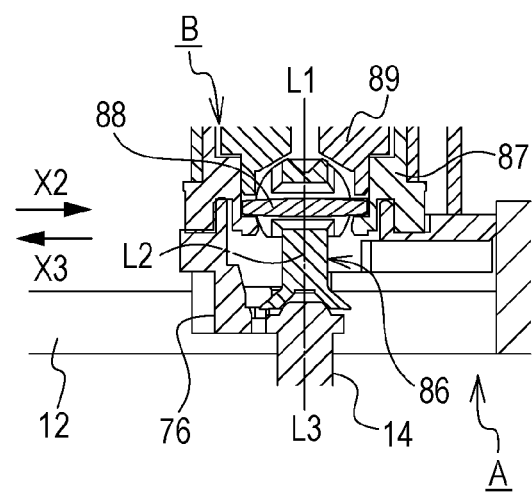

DRUM CYLINDER UNIT, METHOD FOR ATTACHING COUPLING MEMBER, AND DRUM UNIT

TECHNICAL FIELD

The present invention relates to a drum cylinder unit and a drum unit used in an electrophotographic image forming apparatus, such as a laser beam printer. The present invention relates also to a method for attaching a coupling member.

BACKGROUND ART

Regarding an electrophotographic image forming apparatus, the following configuration is proposed: a photoconductive drum, a developing roller, and the like as rotary members related to image formation are integrated as a cartridge that is attachable to and removable from a main body of the image forming apparatus (hereafter "apparatus main body"). To rotate the photoconductive drum in the cartridge, driving force is desirably transmitted to the photoconductive drum from the apparatus main body. A configuration of engaging a cartridge-side coupling member with an apparatus main body-side driving force transmitting unit, such as a drive pin, to transmit driving force is proposed.

In some image forming apparatuses, the cartridge is removable in a predetermined direction which crosses substantially perpendicularly a rotational axis of the photoconductive drum. An apparatus main body which does not have a mechanism for moving the drive pin of the apparatus main body in the direction of the rotational axis by opening and closing a cover of the apparatus main body is proposed. Specifically, PTL 1 and PTL 2 disclose configurations in which a coupling member provided at an end of a photoconductive drum can be tilted to the rotational axis of the photoconductive drum. The coupling member provided in the cartridge engages with a drive pin provided in the apparatus main body so that driving force is transmitted to the cartridge from the apparatus main body.

CITATION LIST

Patent Literature

PTL 1: Japanese Patent Laid-Open No. 2008-233867
PTL 2: Japanese Patent Laid-Open No. 2014-112169

SUMMARY OF INVENTION

Solution to Problem

The present invention develops the above-described related art, and facilitates attachment of a coupling member provided at an end of a photoconductive drum to the photoconductive drum.

According to an aspect of the present invention, a drum cylinder unit used in an electrophotographic image forming apparatus which includes a photoconductive drum and a flange member, wherein the flange member includes a fixing portion fixed to an end of the photoconductive drum, a cylindrical portion which forms a hollow portion therein, a groove portion provided at an edge of the cylindrical portion, and a gear portion, and wherein the groove portion and the hollow portion open to an outside of an axial direction of the photoconductive drum.

Further features of the present invention will become apparent from the following description of exemplary embodiments with reference to the attached drawings.

BRIEF DESCRIPTION OF DRAWINGS

FIG. 5A1 is an explanatory view illustrating attachment and removal of the cartridge to and from the apparatus main body while inclining a coupling member.
FIG. 5B1 is a cross-sectional view illustrating attachment and removal of the cartridge to and from the apparatus main body while inclining the coupling member.
FIG. 5A2 is an explanatory view illustrating attachment and removal of the cartridge to and from the apparatus main body while inclining the coupling member.
FIG. 5B2 is a cross-sectional view illustrating attachment and removal of the cartridge to and from the apparatus main body while inclining the coupling member.
FIG. 5A3 is an explanatory view illustrating attachment and removal of the cartridge to and from the apparatus main body while inclining the coupling member.
FIG. 5B3 is a cross-sectional view illustrating attachment and removal of the cartridge to and from the apparatus main body while inclining the coupling member.
FIG. 5A4 is an explanatory view illustrating attachment and removal of the cartridge to and from the apparatus main body while inclining the coupling member.
FIG. 5B4 is a cross-sectional view illustrating attachment and removal of the cartridge to and from the apparatus main body while inclining the coupling member.

DESCRIPTION OF EMBODIMENTS

Figure 1:
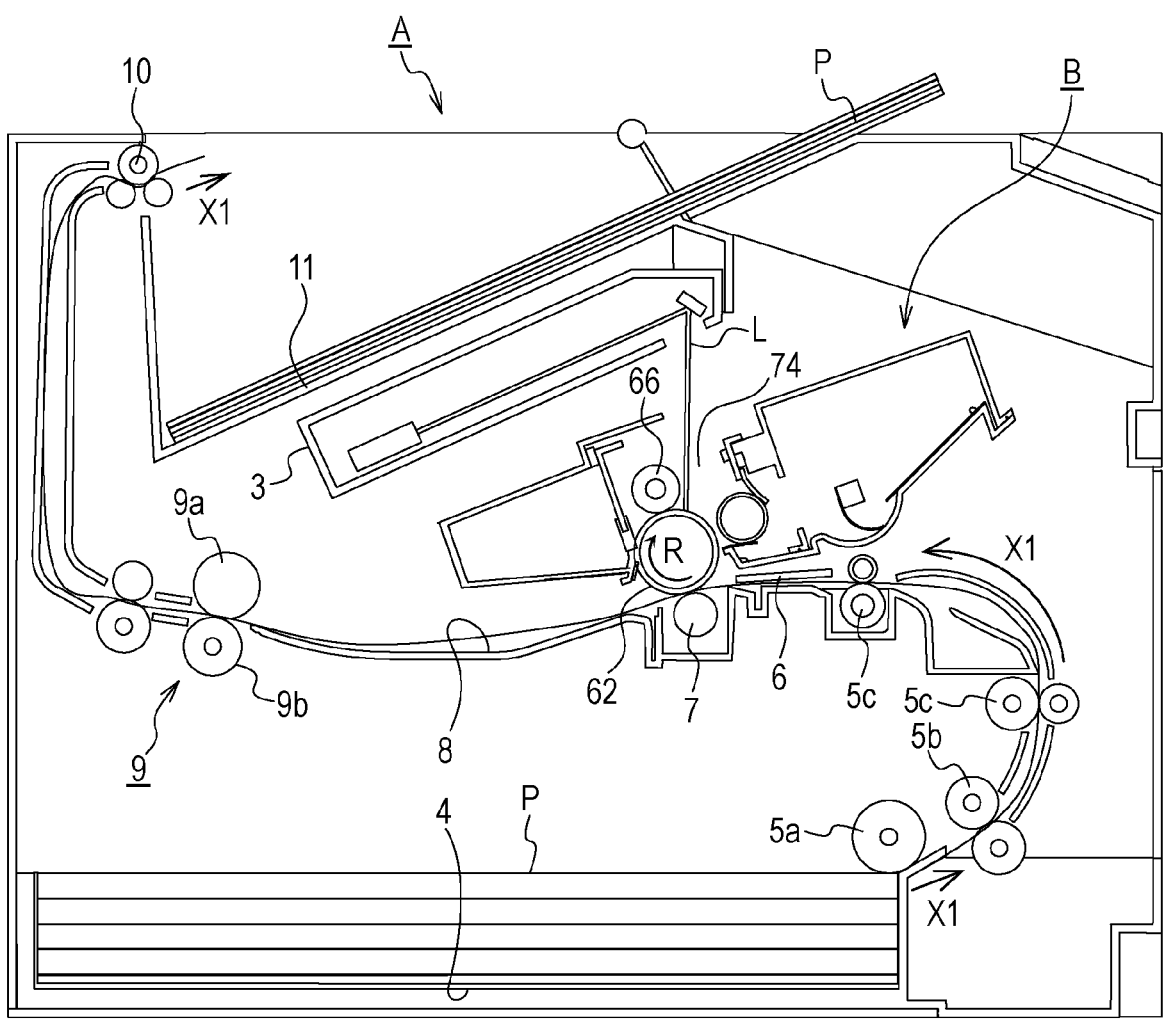
FIG. 1 is a cross-sectional view of an apparatus main body and a cartridge.

Embodiments to which the present invention is applied are described hereafter with reference to the drawings.

An image forming apparatus employing electrophotography is herein referred to as an electrophotographic image forming apparatus. Electrophotography is a method for developing an electrostatic image formed on a photoconductor with toner. Any developing system including the one-component developing system, the two-component developing system, and the dry developing system may be employed. An electrophotographic photoconductive drum herein has a photoconductor on a surface layer of a drum-shaped cylinder used for an electrophotographic image forming apparatus.

Here, a charging roller, a developing roller, and the like related to image formation acting on the photoconductive drum are referred to as process means. The cartridge provided with a photoconductor or a process means related to image formation (e.g., a cleaning blade and a developing roller) is referred to as a process cartridge. In the embodiments, a process cartridge in which a photoconductive drum, a charging roller, a developing roller, and a cleaning blade are integrated is described as an example.

In the embodiments, a laser beam printer is described as an exemplary electrophotographic image forming apparatus used for various applications, such as a multifunctional peripheral, a facsimile, and a printer. Reference numerals in the embodiments are provided for the reference of the drawings and are not limiting the configurations. Dimensions in the embodiments are presented for describing relationships clearly, and are not limiting the configurations.

The longitudinal direction of the process cartridge in the embodiments refers to the direction substantially perpendicularly crossing the direction in which the process cartridge is attached to and removed from a main body of the electrophotographic image forming apparatus. The longitudinal direction of the process cartridge is parallel to the rotational axis of the electrophotographic photoconductive drum (the direction crossing a sheet conveying direction). In the longitudinal direction, a side of the process cartridge on which the photoconductive drum receives rotational force from the image forming apparatus main body is defined as a driving side (a driven side), and the opposite side thereof is defined as a non-driving side. Unless otherwise specified, the term "above" (upper) means an upper side in the gravity direction when the image forming apparatus is installed and the opposite direction is defined as "below" (lower) in the gravity direction.

First Embodiment

A laser beam printer in the present embodiment is described hereafter with reference to the drawings. The cartridge in the present embodiment is a process cartridge in which a photoconductive drum as a photoconductor (an image bearing member or a rotary member), a developing roller, a charging roller, and a cleaning blade as process means are integrated. The cartridge is attachable to and removable from the apparatus main body. The cartridge has a gear, a photoconductive drum, a flange, a developing roller, and the like as rotary members/rotating members which rotate upon reception of rotational force from the apparatus main body.

Among the rotary members/rotating members, a member which bears and conveys a toner image is referred to as an image bearing member.

A configuration of a laser beam printer as an electrophotographic image forming apparatus and an image formation process are described hereafter with reference to FIG. 1. Then detailed configuration of a process cartridge is described with reference to FIGS. 2 and 3.

(Laser Beam Printer and Image Formation Process)

Figure 2:
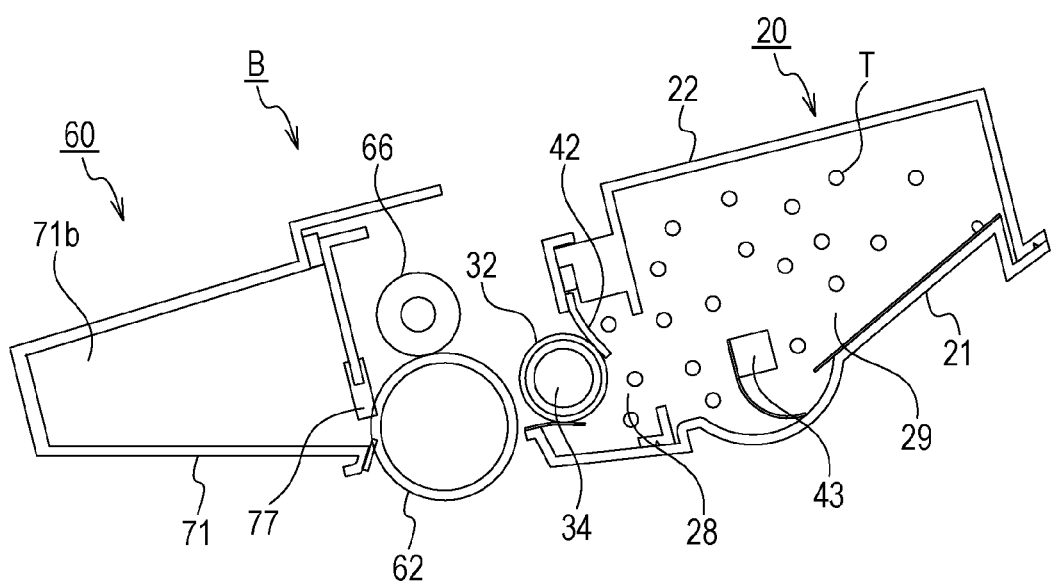
FIG. 2 is a cross-sectional view of the cartridge.

FIG. 1 is a cross-sectional view of a laser beam printer apparatus main body A (hereafter "apparatus main body A") which is an electrophotographic image forming apparatus, and a process cartridge (hereafter "cartridge B"). FIG. 2 is a cross-sectional view of the cartridge B.

The apparatus main body A herein refers to a laser beam printer which is an electrophotographic image forming apparatus from which the detachable cartridge B has been removed.

First, a configuration of the laser beam printer which is an electrophotographic image forming apparatus is described with reference to FIG. 1.

The electrophotographic image forming apparatus illustrated in FIG. 1 is an electrophotographic laser beam printer in which the cartridge B is attachable to and removable from the apparatus main body A. When the cartridge B is attached to the apparatus main body A, the cartridge B is disposed below a laser scanner unit 3 which is an exposure unit (an exposure apparatus).

A sheet tray 4 for containing sheets P as recording media (sheet materials) which are targets (objects) on which the image forming apparatus forms an image is disposed below the cartridge B.

In the apparatus main body A, a pickup roller 5a, a feeding roller pair 5b, a conveyance roller pair 5c, a transfer guide 6, a transfer roller 7, a conveyance guide 8, a fixing device 9, a discharge roller pair 10, and a discharge tray 11 are disposed sequentially from the upstream in a conveyance direction X1 of the sheet P. The fixing device 9 as a fixing means is constituted by a heat roller 9a and a pressure roller 9b.

Next, an image formation process is described schematically with reference to FIGS. 1 and 2.

In accordance with a print start signal, a drum cylinder 62 as a rotatable photoconductive drum is driven to rotate at a predetermined peripheral speed (a process speed) in the direction of arrow R (hereafter "rotational direction R") with a developer born thereon.

The drum cylinder 62 is a drum-shaped (cylindrical) electrophotographic photoconductor (a photoconductive drum) in which a photoconductive layer is formed on a surface thereof.

A charging roller 66 to which a bias voltage is applied is brought into contact with an outer peripheral surface of the drum cylinder 62 to charge the outer peripheral surface of the drum cylinder 62 uniformly.

The laser scanner unit 3 as the exposure unit outputs laser light L in accordance with image information input in the laser printer. The laser light L passes through an exposure window 74 on an upper surface of the cartridge B and scan-exposes the outer peripheral surface of the drum cylinder 62. The drum cylinder 62 is thus partially discharged and an electrostatic image (an electrostatic latent image) is formed on a surface of the photoconductive drum.

As illustrated in FIG. 2, in a developing unit 20 as a developing device, the developer (hereafter, "toner T") in a toner chamber 29 is agitated and conveyed by the rotation of a conveyance screw 43 as a conveyance member, and is sent out to a toner supply chamber 28.

The toner T as the developer is born on a surface of a developing roller 32 as a developing unit (a process means and a rotary member) by magnetic force of a magnet roller 34 (stationary magnet). The developing roller 32 functions as a rotary member which bears and conveys the developer to a development area to develop the electrostatic image formed on the drum cylinder 62. The thickness of the layer of the toner T conveyed to the development area on the peripheral surface of the developing roller 32 is regulated by a developing blade 42. The toner T is charged by friction between the developing roller 32 and the developing blade 42.

The toner T born by the developing roller 32 develops (visualizes) the electrostatic image formed on the drum cylinder 62. The drum cylinder 62 is rotated in a rotational direction R with the toner (the toner image, the developer image) developed on the surface thereof. That is, the drum cylinder (the photoconductive drum) 62 is an image bearing member which bears the image (the toner image). The developing roller 32 is a developer bearer which bears the developer (the toner) and develops the latent image formed on the drum cylinder 62.

As illustrated in FIG. 1, in accordance with output timing of the laser light L, the sheet P contained in the lower portion of the apparatus main body A is fed from the sheet tray 4 by the pickup roller 5a, the feeding roller pair 5b, and the conveyance roller pair 5c.

The sheet P is supplied to a transfer position (a transfer nip) between the drum cylinder 62 and the transfer roller 7 via the transfer guide 6. At the transfer position, the toner image is sequentially transferred from the drum cylinder 62 as the image bearing member to the sheet P as the recording medium.

The sheet P to which the toner image has been transferred is separated from the drum cylinder 62 and conveyed to the fixing device 9 along the conveyance guide 8. The sheet P passes through a fixing nip portion of the heat roller 9a and the pressure roller 9b which constitute the fixing device 9. At the fixing nip portion, the unfixed toner image on the sheet P is fixed to the sheet P with pressure and heat. Then, the sheet P to which the toner image is fixed is conveyed by the discharge roller pair 10, and is discharged to the discharge tray 11.

As illustrated in FIG. 2, residual toner remaining on the drum surface which has not been transferred to the sheet adheres to the surface of the drum cylinder 62 after the transfer of the toner T to the sheet. The residual toner is removed by a cleaning blade 77 in contact with the peripheral surface of the drum cylinder 62. Then the toner remaining on the drum cylinder 62 is cleaned and the cleaned drum cylinder 62 is charged again for the use of the image formation process. The toner (the residual toner) removed from the drum cylinder 62 is stored in a waste toner chamber 29 of the cleaning unit 60.

In the above description, the charging roller 66, the developing roller 32, and the cleaning blade 77 function as process means acting on the drum cylinder 62. Although the image forming apparatus of the present embodiment employs a method for removing the residual toner by the cleaning blade 77, a method in which chargeadjusted residual toner is collected simultaneously with development in the developing device (a cleanerless method) may be employed. In the cleanerless method, an auxiliary charging member (e.g., an auxiliary charging brush) for adjusting charge of the residual toner also functions as a process means.

(Configuration of Process Cartridge)

Next, a detailed configuration of the cartridge B is described with reference to FIGS. 2 and 3.

Figure 3:
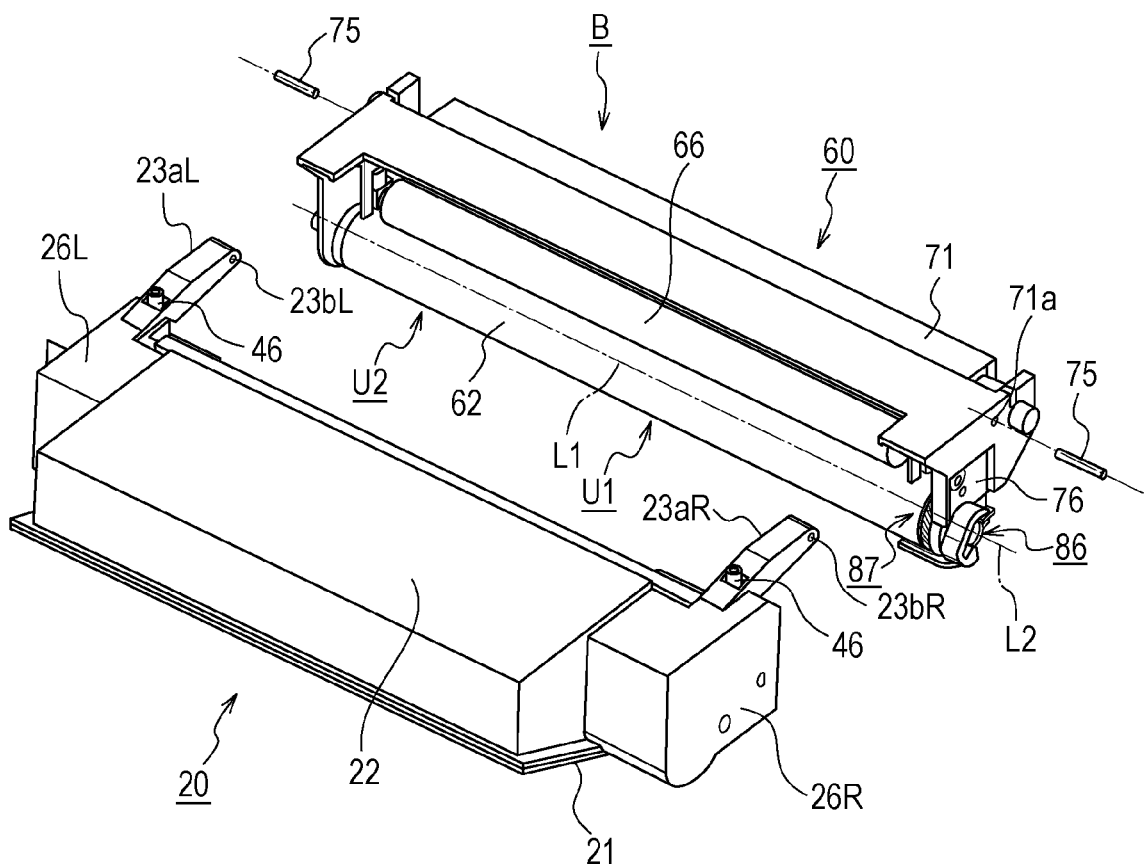
FIG. 3 is an exploded perspective view of the cartridge.

FIG. 3 is an exploded perspective view of the cartridge B. A frame of the cartridge B may be disassembled into a plurality of units. The cartridge B of the present embodiment is constituted by two units (i.e., the cleaning unit 60 and the developing unit 20) integrated with each other. Although the cleaning unit 60 holding the drum cylinder 62 and the developing unit 20 are connected with two connecting pins 75 in the present embodiment, three or more units may be integrated. Alternatively, a plurality of units may be used without being connected by coupling members, such as pins, so that some of the units may be replaced.

The cleaning unit 60 is constituted by a cleaning frame 71, a drum unit U1, the charging roller 66, the cleaning blade 77 and the like.

Figure 6A:
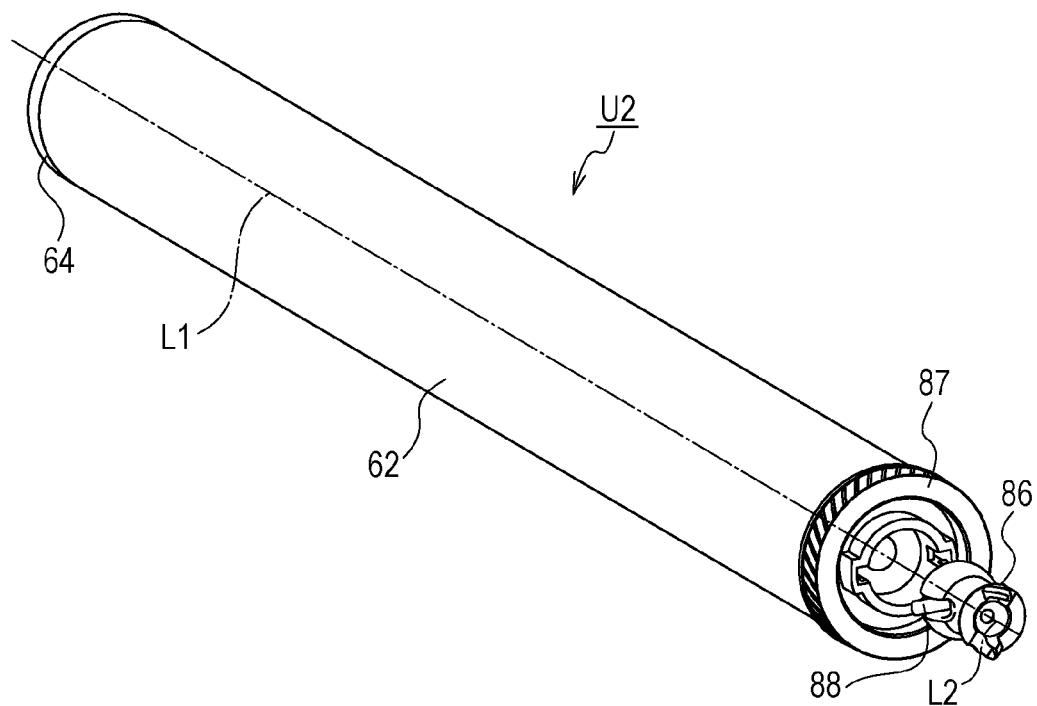
FIG. 6A is an explanatory view of a drum unit.
Figure 6B:
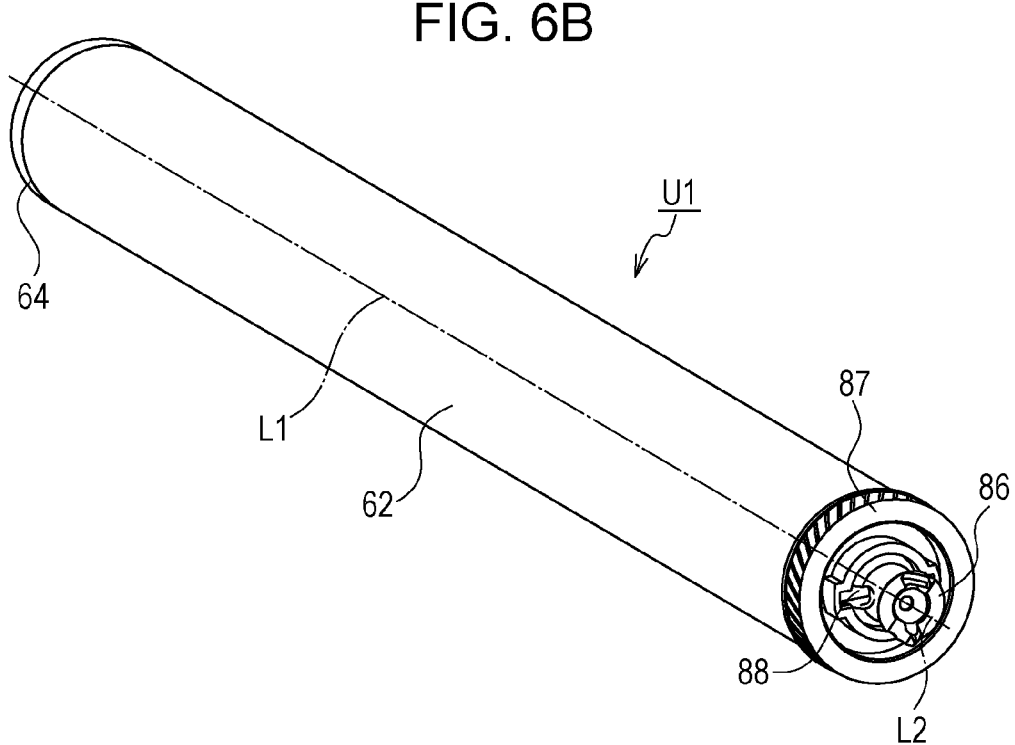
FIG. 6B is an explanatory view of the drum unit.

The drum unit U1 is constituted by a drum cylinder unit U2, a coupling member 86 provided at a driving-side end of the drum cylinder unit U2, and a pin 88 (see FIGS. 6A and 6B). The drum cylinder unit U2 is constituted by the drum cylinder 62, a driving-side flange 87 as a flange member attached to the driving side of the drum cylinder 62 (details thereof are described later), and the like.

Rotational force from the apparatus main body A is transmitted to the drum cylinder 62 via the driving-side flange 87 and the coupling member 86.

As illustrated in FIG. 3, the drum cylinder 62 is rotatable about a rotational axis L1 (hereafter, "axis L1"). The coupling member 86 is rotatable about a rotational axis L2 (hereafter, "axis L2"). The coupling member 86 can be inclined (tilted) with respect to the drum cylinder 62. That is, an inclination angle of the coupling member 86 with respect to the driving-side flange 87 or the drum cylinder 62 is variable. Therefore, the axis L2 can be inclined to the axis L1 (the inclination angle is variable). Details are described later.

As illustrated in FIGS. 2 and 3, the developing unit 20 is constituted by a toner storage container 22, a bottom material 21, a first side member 26L (a non-driving side), a second side member 26R (a driving side), a developing blade 42, a developing roller 32, and a magnet roller 34. The conveyance screw 43 (an agitation sheet) as a conveyance member which conveys the toner, and the toner T as a developer are provided in the toner container 22. The developing unit 20 has a compression spring 46 which applies urging force to regulate orientation of the developing unit 20 between the developing unit 20 and the cleaning unit 60. The cleaning unit 60 and the developing unit 20 are pivotally connected by the connecting pins 75 as connecting members and configure the cartridge B.

Specifically, pivot holes 23bL and 23bR are provided at ends of arm portions 23aL and 23aR provided at both ends of the developing unit 20 in the longitudinal direction (the axial direction of the developing roller 32). The pivot holes 23bL and 23bR are provided in parallel with an axis of the developing roller 32.

An insertion hole 71a in which the connecting pin 75 is inserted is formed at each of both end portions in the longitudinal direction of the cleaning frame 71 which is a cleaning unit 60-side frame. The connecting pins 75 are inserted in the pivot holes 23bL and 23bR, and the insertion holes 71a with the arm portions 23aL and 23aR aligned with predetermined positions of the cleaning frame 71. Then the cleaning unit 60 and the developing unit 20 are combined pivotally about the connecting pins 75 as the connecting members.

The compression spring 46 attached to each of bases of the arm portions 23aL and 23aR is brought into contact with the cleaning frame 71 and urges the developing unit 20 against the cleaning unit 60 about the connecting pin 75 as a pivotal shaft.

In this manner, the developing roller 32 as a process means is reliably pressed in the direction of the drum cylinder 62 as the rotary member. The developing roller 32 is kept at a predetermined distance from the drum cylinder 62 by a spacer (not illustrated) as a ring-shaped spacing member attached to each of the both end portions of the developing roller 32.

(Attachment and Removal of Process Cartridge)

Attachment and removal of the cartridge B to and from the apparatus main body A in the above-described configuration will be described with reference to FIGS. 4A to 5B4.

Figure 4A:
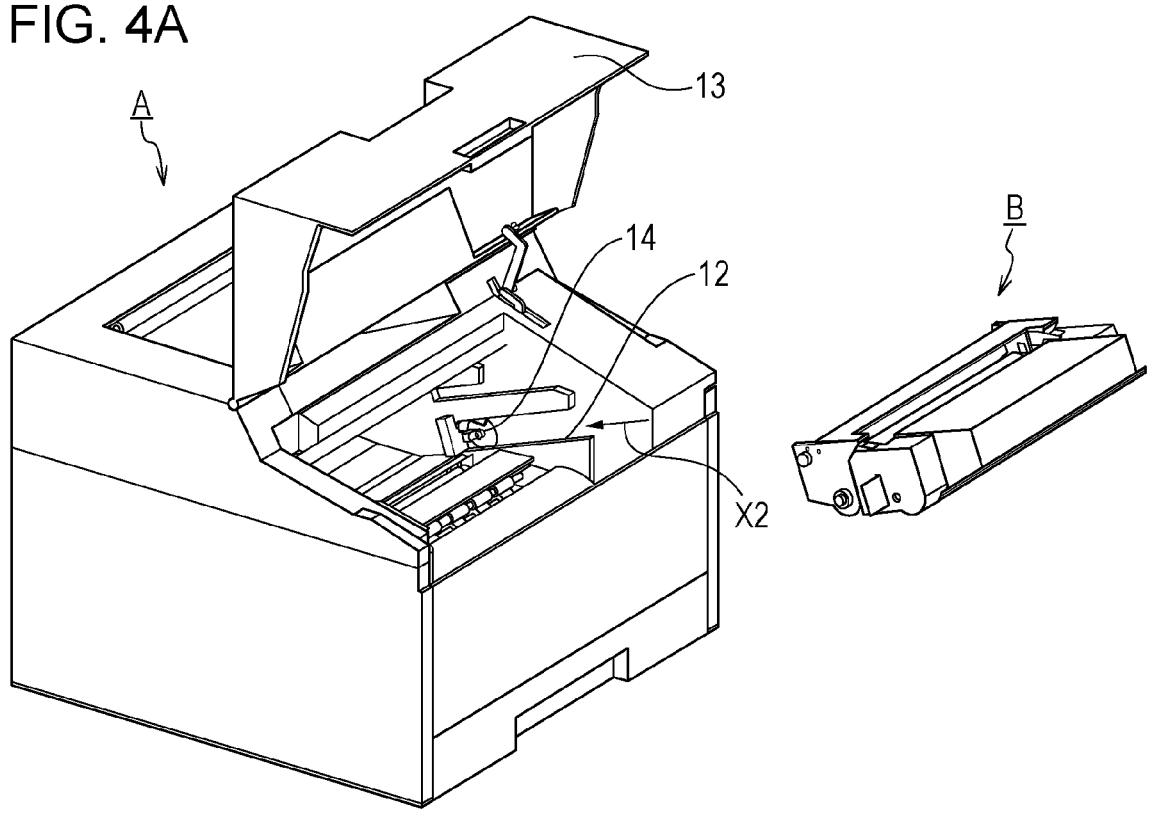
FIG. 4A is an explanatory view illustrating attachment and removal of the cartridge to and from the apparatus main body.
Figure 4B:
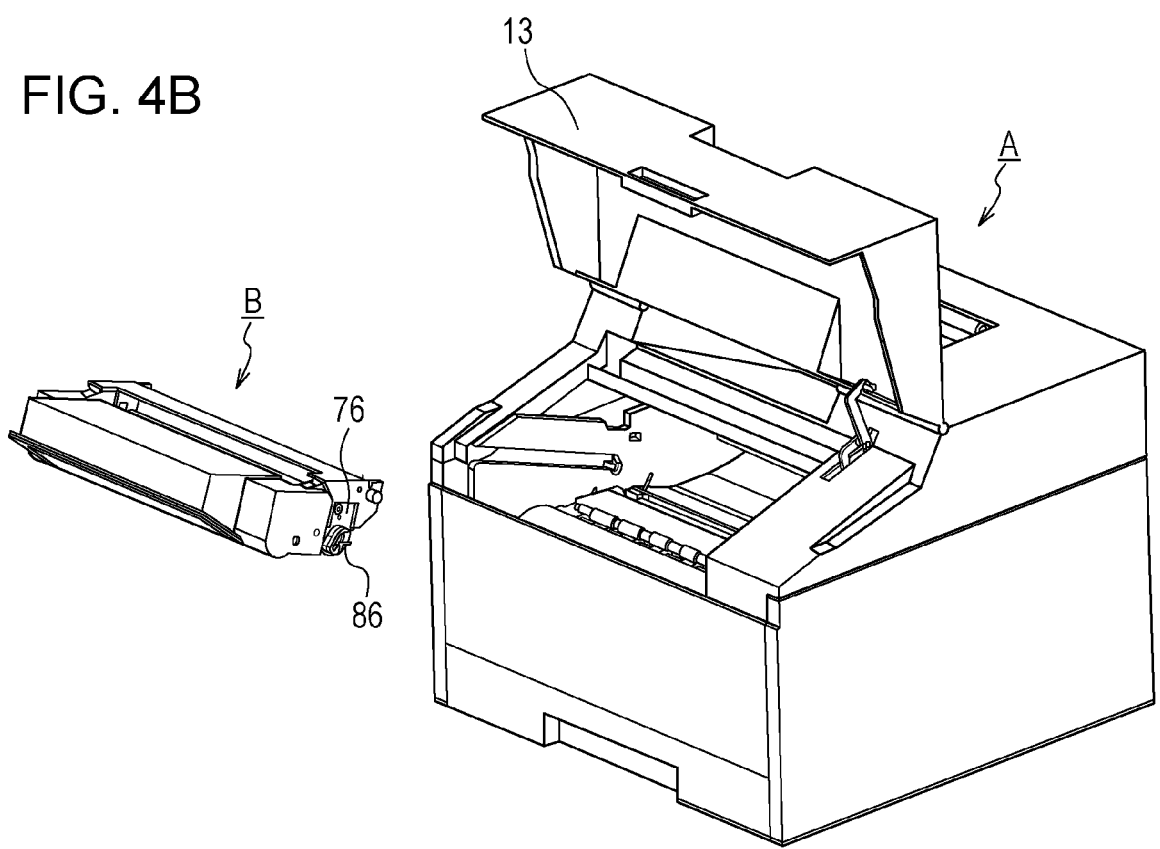
FIG. 4B is an explanatory view illustrating attachment and removal of the cartridge to and from the apparatus main body.

FIGS. 4A and 4B are explanatory views illustrating attachment and removal of the cartridge B to and from the apparatus main body A. FIG. 4A is a perspective view seen from the non-driving side, and FIG. 4B is a perspective view seen from the driving side. The driving side refers to an end in the longitudinal direction at which the coupling member 86 of the cartridge B is provided.

A door 13 is pivotally attached to the apparatus main body A. FIGS. 4A and 4B illustrate the apparatus main body A in the state in which the door 13 is open.

A driving head 14 and a guide member 12 as a guide mechanism are provided inside the apparatus main body A. The driving head 14, provided on the apparatus main body A side, is a main body-side drive transmission mechanism which transmits driving force to the cartridge B attached to the apparatus main body A, and engages with the coupling member 86 of the cartridge B. Rotational force can be transmitted to the cartridge B when the driving head 14 is rotated after the engagement. The driving head 14 is rotatably supported by the apparatus main body A. The driving head 14 has a drive pin 14b as an application portion which applies rotational force (see FIG. 5B3).

The guide member 12 as the guide mechanism is a body-side guide member which guides the cartridge B into the apparatus main body A. The guide member 12 may be a plate-shaped member with a guide groove or may be a member which guides the cartridge B while supporting the cartridge B from below.

A state in which the cartridge B is attached to and removed from the apparatus main body A while inclining (tilting, rocking, or turning) the coupling member 86 as a driving force transmitting part is described hereafter with reference to FIGS. 5A1 to 5B4.

FIGS. 5A1 to 5B4 are explanatory views of attachment and removal of the cartridge B to and from the apparatus main body A while inclining (tilting, rocking, or turning) the coupling member 86. FIGS. 5A1 to 5A4 are enlarged views of an area near the coupling member 86 seen from the driving side to the non-driving side. FIG. 5B1 is a cross-sectional view taken along line VB1-VB1 of FIG. 5A1 (VB1 cross-sectional view). Similarly, FIG. 5B2 is a cross-sectional view taken along line VB2-VB2 of FIG. 5A2 (VB2 cross-sectional view), FIG. 5B3 is a cross-sectional view taken along line VB2-VB3 of FIG. 5A3 (VB3 cross-sectional view), and FIG. 5B4 is a cross-sectional view taken along line VB4-VB4 of FIG. 5A4 (VB4 cross-sectional view).

The process of attaching the cartridge B to the apparatus main body A is illustrated in the order of FIG. 5A1 to FIG. 5A4. FIG. 5A4 illustrates the state in which attachment of the cartridge B to the apparatus main body A is completed. In FIGS. 5A1 to 5B4, the guide member 12 and the driving head 14 are illustrated as parts of the apparatus main body A, and other parts are illustrated as parts of the cartridge B.

Directions illustrated by the arrow X2 and the arrow X3 in FIGS. 5A1 to 5B4 cross substantially perpendicularly a rotational axis L3 of the driving head 14. The direction illustrated by the arrow X2 is referred to as an X2 direction and the direction illustrated by the arrow X3 is referred to as an X3 direction. Similarly, the X2 and X3 directions substantially perpendicularly cross the axis L1 of the drum cylinder 62 of the process cartridge. In FIGS. 5A1 to 5B4, the direction illustrated by the arrow X2 is the direction in which the cartridge B is attached to the apparatus main body A. The direction illustrated by the arrow X3 is the direction in which the cartridge B is removed from the apparatus main body. The directions illustrated by the arrow X2 and the arrow X3 may be collectively considered as the attachment/ removal direction. It can also be considered that attachment and removal have implications of directions. In that case, expressions of "upstream in the attachment direction," "downstream in the attachment direction," "upstream in the removal direction," "downstream in the removal direction," and the like may be used.

As illustrated in FIGS. 5A1 to 5B4, the cartridge B has a spring as an urging member (an elastic member). In the present embodiment, a torsion spring 91 is used as the spring. The torsion spring 91 urges a free end portion 86a of the coupling member 86 to fall toward the driving head 14. That is, in the attaching process of the cartridge B, the torsion spring 91 urges the coupling member 86 so that the free end portion 86a faces the downstream in the attachment direction. The cartridge B is inserted in the apparatus main body A with the free end portion 86a of the coupling member 86 facing the driving head 14.

Here, the rotational axis of the drum cylinder 62 is defined as the axis L1, the rotational axis of the coupling member 86 is defined as the axis L2, and the rotational axis of the driving head 14 as the main body-side engaging portion is defined as the axis L3. Then the axis L2 is inclined to the axes L1 and L3 as illustrated in FIGS. 5B1 to 5B3.

When the cartridge B is inserted to such an extent as illustrated in FIGS. 5A3 and 5B3, the coupling member 86 is in contact with the driving head 14. FIG. 5B3 illustrates an example in which the drive pin 14b as the application portion which applies rotational force is in contact with a standby portion 86k1 of the coupling member. This contact regulates the position (tilting) of the coupling member 86 and the amount of inclination (tilting) of the axis L2 with respect to the axis L1 (the axis L3) decreases gradually.

In the present embodiment, the drive pin 14b as the application portion is in contact with the standby portion 86k1 of the coupling member. However, the contact position of the coupling member 86 and the driving head 14 changes depending on the phase state in the rotational direction of the coupling member 86 and the driving head 14. Therefore, the contact position of the present embodiment is not restrictive. It is only necessary that any part of the free end portion 86a of the coupling member is in contact with any part of the driving heads 14.

When the cartridge B is inserted to reach an attachment completion position, as illustrated in FIGS. 5A4 and 5B4, the axis L2 is located on substantially the same line with the axis L1 (axis L3). That is, the rotation axes of the coupling member 86, the driving head 14, and the drum cylinder 62 are located substantially on the same line.

Thus, rotational force can be transmitted from the apparatus main body A to the cartridge B when the coupling member 86 provided in the cartridge B engages with the driving head 14 provided in the apparatus main body A. When the cartridge B is to be removed from the apparatus main body A, the state is shifted from those illustrated in FIGS. 5A4 and 5B4 to those illustrated in FIGS. 5A1 and 5B1. When the coupling member 86 is inclined (tilted) with respect to the axis L1 in the same manner as in the attachment operation, the coupling member 86 is separated from the driving head 14. That is, the cartridge B is moved in the X3 direction (crossing substantially perpendicularly the rotational axis L3 of the driving head 14) opposite to the X2 direction, and the coupling member 86 is separated from the driving head 14.

The cartridge B is moved in the X2 direction or the X3 direction is only in the area near the attachment completion position. The cartridge B may be moved in any directions at locations other than the area near the attachment completion position. That is, it is only necessary that a movement locus of the cartridge B immediately before the engagement or removal of the coupling member 86 with or from the driving head 14 moves in a predetermined direction substantially perpendicularly crossing the rotational axis L3 of the driving head 14.

(Drum Unit)

The drum unit U1 incorporated in the cleaning unit 60 (see FIG. 3) is described with reference to FIGS. 6A and 6B. FIGS. 6A and 6B are explanatory views of the drum unit U1. FIG. 6A is an exploded perspective view and FIG. 6B is a perspective view. As illustrated in FIGS. 6A and 6B, the drum unit U1 is configured by attaching the coupling member 86 and the pin 88 to the drum cylinder unit U2. Each part constituting the drum unit U1 and an assembly method are described in detail hereafter.

(Coupling Member and Pin)

First, the coupling member 86 and the pin 88 are described with reference to FIGS. 7A to 7C.

Figure 7A:
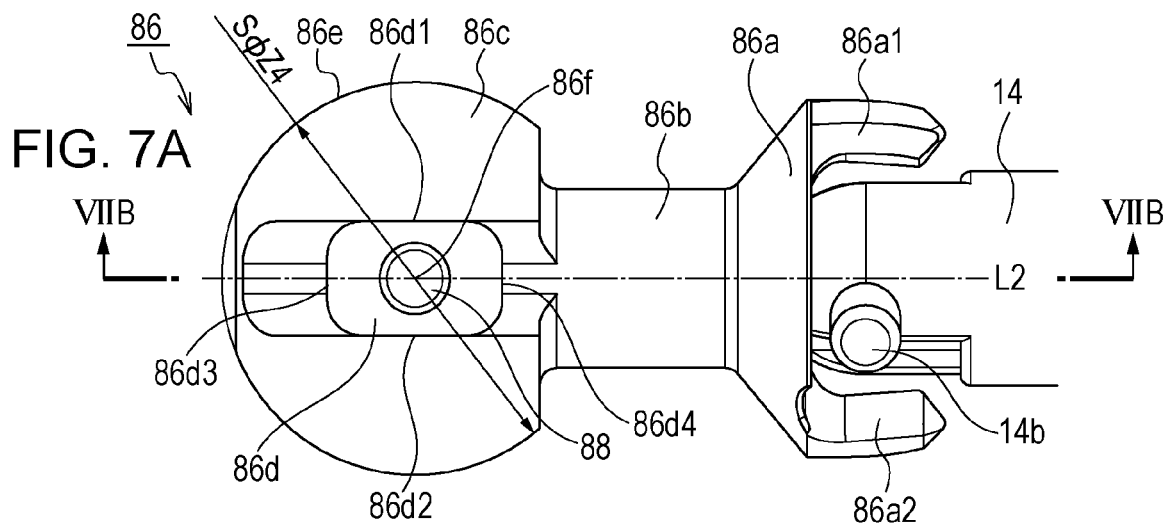
FIG. 7A is an explanatory view of the coupling member and a pin.
Figure 7B:
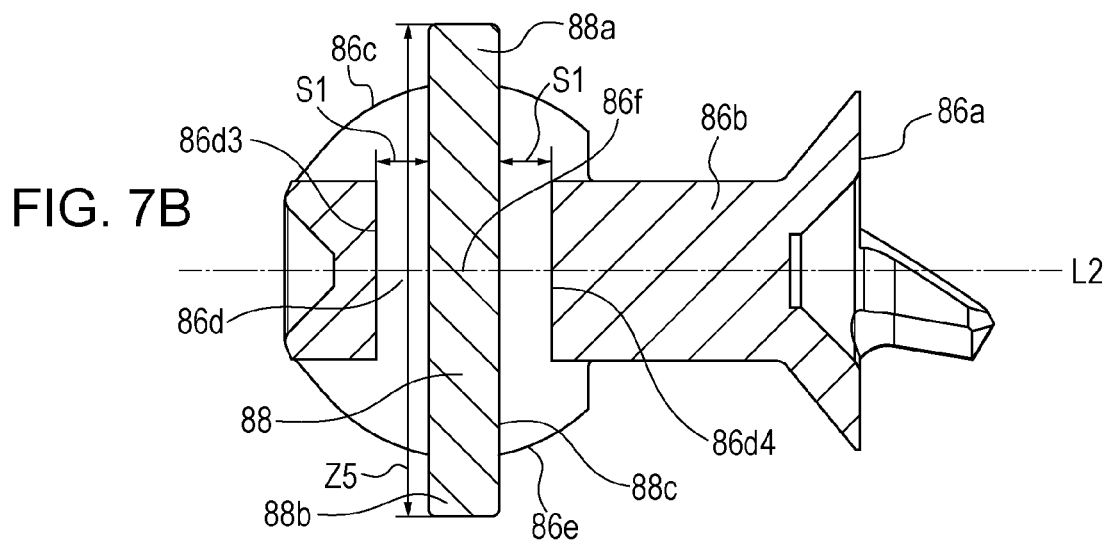
FIG. 7B is a cross-sectional view of the coupling member and the pin.
Figure 7C:
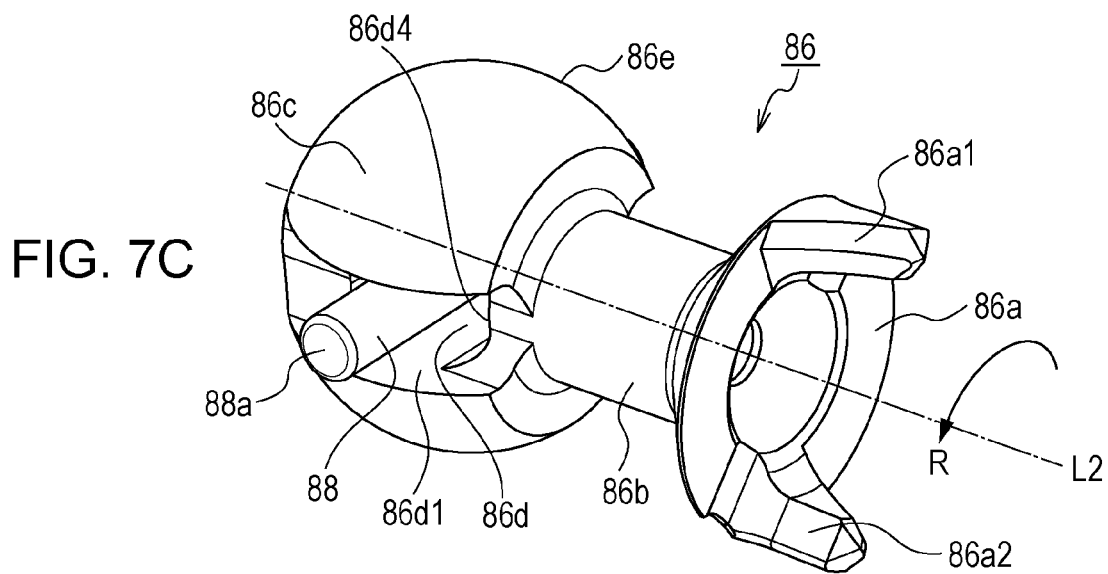
FIG. 7C is an explanatory view of the coupling member and the pin.

FIGS. 7A to 7C are explanatory views of the coupling member 86 and the pin 88. FIG. 7A is an explanatory side view of the coupling member 86 to which the driving head 14 is added seen in the direction vertical to the axis L2. FIG. 7B is a VIIB cross-sectional view taken along line VIIB-VIIB of FIG. 7A. FIG. 7C is a perspective view.

As illustrated in FIG. 7A, the coupling member 86 mainly has three portions. The first portion is the free end portion 86a which engages with the driving head 14 and receives rotational force from the driving head 14 (the drive pin 14b thereof). The second portion is a connecting portion 86c which is substantially spherical in shape, and is contained in a hollow portion 87e (details thereof are described later) of the driving-side flange 87. The third portion is a link portion 86b which links the free end portion 86a and the connecting portion 86c.

The free end portion 86a has two projections (86a1 and 86a2) which are in contact with the drive pin 14b of the driving head 14 to receive rotational force of the driving head 14.

The connecting portion 86c has a spherical surface 86e which is substantially spherical in shape and a through hole portion 86d which penetrates the spherical surface 86e. The connecting portion 86c (the spherical center 86f thereof) becomes the tilt center of the coupling member 86 when the coupling member 86 is contained in the driving-side flange 87.

As illustrated in FIG. 7B, the pin 88 as a cylindrical column member is provided to penetrate the through hole portion (the first through hole portion) 86d. The length Z5 of the pin 88 is longer than a diameter sφZ4 of the spherical surface 86e (see FIG. 7A), and both ends (88a and 88b) of the pin 88 project to the outside of the spherical surface 86e. When rotational force in the rotational direction R is transmitted to the coupling member 86 from the driving head 14, the through hole portion 86d (the side surfaces 86d1 and 86d2 thereof) are brought into contact with a cylindrical surface 88c of the pin 88 and the rotational force is transmitted to the pin 88. The both end portions (88a and 88b) of the pin 88 are brought into contact with a side surface 87f1

(details thereof are described later) of the driving-side flange 87, and the pin 88 transmits rotational force to the driving-side flange 87.

That is, the pin 88 is a transmission member which transmits rotational force (driving force) of the coupling member 86 to the driving-side flange 87.

(Drum Cylinder Unit and Driving-Side Flange)

Figure 8A:
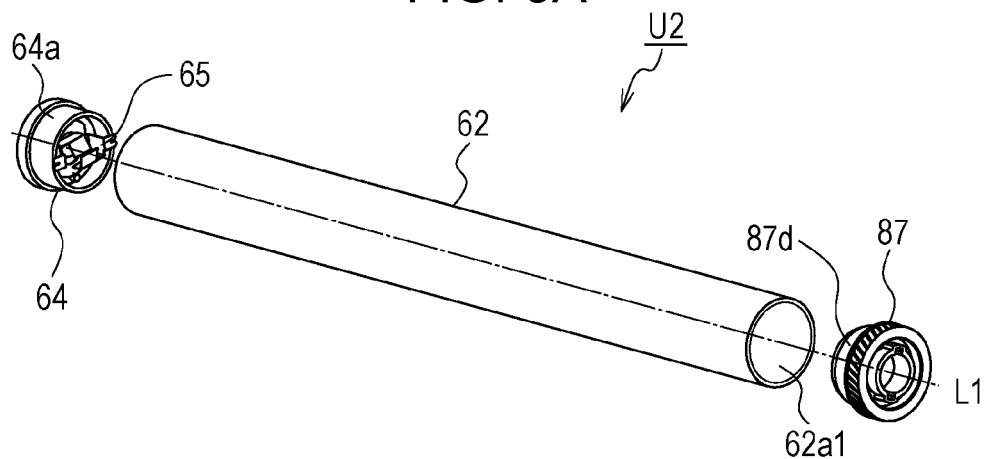
FIG. 8A is an explanatory view of a configuration of a drum cylinder unit.
Figure 8B:
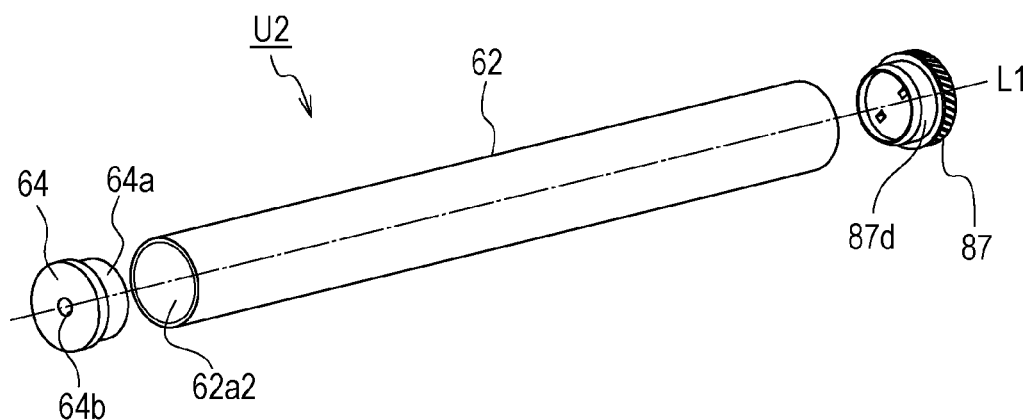
FIG. 8B is an explanatory view of a configuration of the drum cylinder unit.
Figure 8C:
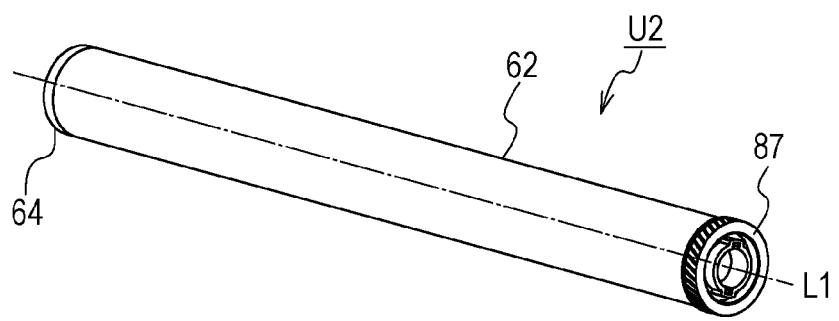
FIG. 8C is an explanatory view of a configuration of the drum cylinder unit.

The drum cylinder unit U2 to which the coupling member 86 and the pin 88 are attached is described in detail with reference to FIGS. 8A to 8C. FIGS. 8A to 8C are explanatory views of a configuration of the drum cylinder unit U2. FIG. 8A is an exploded perspective view seen from the driving side, FIG. 8B is an exploded perspective view seen from the non-driving side, and FIG. 8C is a perspective view seen from the driving side.

As illustrated in FIGS. 8A to 8C, the drum cylinder unit U2 is constituted by the drum cylinder 62, the driving-side flange 87, a non-driving-side flange 64, and a grounded plate 65. The drum cylinder 62 is a conductive member made of, for example, Al, of which outer peripheral surface is covered with a photoconductive layer. The drum cylinder 62 may be hollow or solid.

Regarding the driving-side flange 87, as illustrated in FIG. 8A, in the driving side of the drum cylinder 62, a fixing portion 87d fits into an opening 62a1 of the drum cylinder 62 and is fixed to the drum cylinder 62 by adhesion, caulking, and other means. When the driving-side flange 87 is rotated, the drum cylinder 62 is rotated integrally therewith. The driving-side flange 87 is fixed to the drum cylinder 62 so that the rotational axis of the driving-side flange 87 is coaxial (on the same line) with the axis L1 of the drum cylinder 62. Therefore, the rotational axis of the driving-side flange 87 is also referred to as the axis L1 hereafter.

Similarly, the non-driving-side flange 64 is disposed at an end of the non-driving side of the drum cylinder 62 so that the rotation axis of the non-driving-side flange 64 becomes coaxial with the drum cylinder 62. Regarding the non-driving-side flange 64, as illustrated in FIG. 8B, a fixed portion 64a fits into the opening 62a2 of the drum cylinder 62, and is fixed to the drum cylinder 62 by adhesion, caulking, or other means. The conductive (mainly metallic) grounded plate 65 is disposed in the non-driving-side flange 64. The grounded plate 65 is in contact with an inner peripheral surface of the drum cylinder 62, and electrically connects the apparatus main body A with the drum cylinder 62 further via an unillustrated electric contact.

Figure 9A:
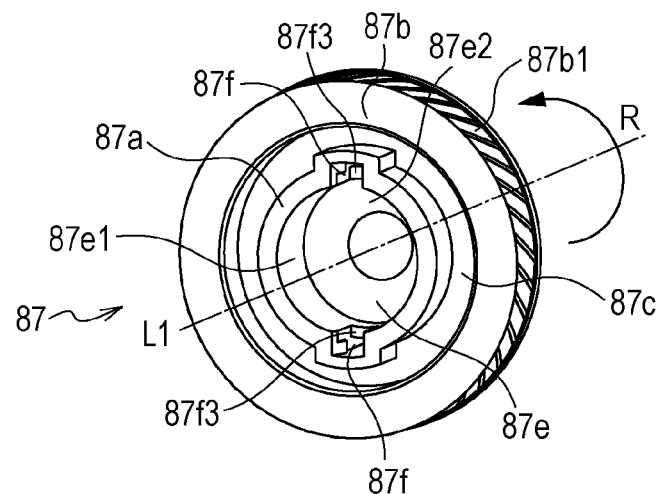
FIG. 9A is an explanatory view of a driving-side flange.
Figure 9B:
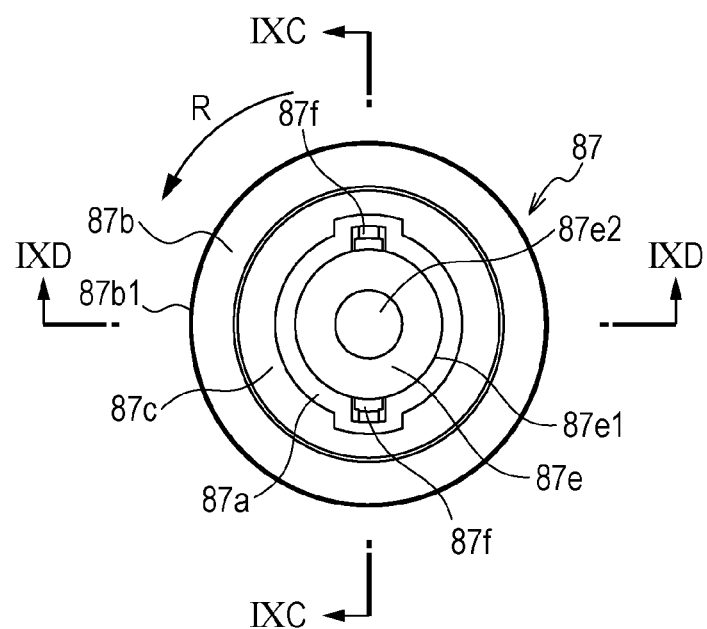
FIG. 9B is an explanatory view of the driving-side flange.
Figure 9C:
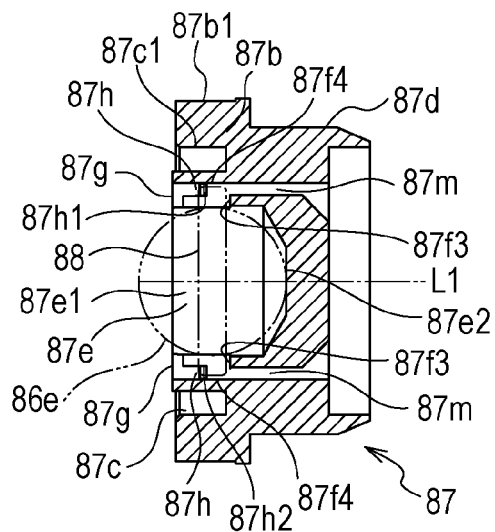
FIG. 9C is a cross-sectional view of the driving-side flange.
Figure 9D:
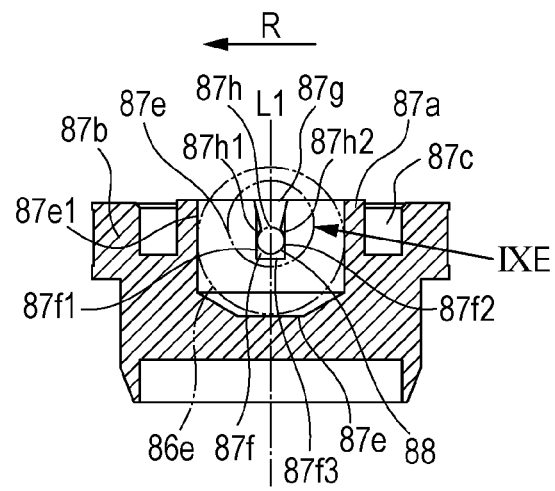
FIG. 9D is a cross-sectional view of the driving-side flange.
Figure 9E:
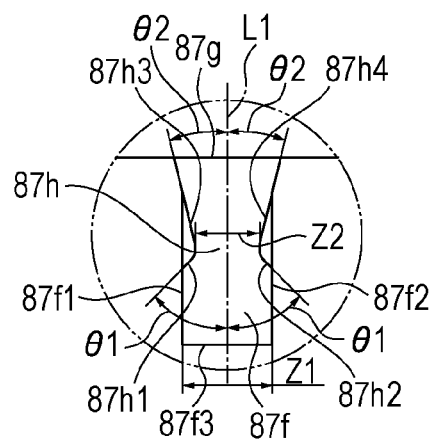
FIG. 9E is an enlarged view of the driving-side flange.

A configuration of the driving-side flange 87 is described with reference to FIGS. 9A to 9E. FIGS. 9A to 9E are explanatory views of the driving-side flange 87. FIG. 9A is a perspective view, FIG. 9B is a front view seen from the outer side of the driving side, FIG. 9D is a IXD cross-sectional view taken along line IXD-IXD of FIG. 9B, FIG. 9C is a IXC cross-sectional view taken along line IXC-IXC of FIG. 9B, and FIG. 9E is an enlarged view of a part of FIG. 9D (IXE).

As illustrated in FIG. 9C, the driving-side flange 87 has a fixing portion 87d fixed to the drum cylinder 62 so that the driving-side flange 87 rotates integrally with the drum cylinder 62. As illustrated in FIGS. 9A and 9B, the driving-side flange 87 has a cylindrical portion (a cylindrical portion formed in a substantially round cylindrical shape) 87a of which central axis is axis L1. The cylindrical portion is disposed further driving side than the fixing portion 87d (further outside of the drum cylinder 62 than the fixing portion 87d: see FIG. 8A). The driving-side flange 87 further has a second cylindrical portion (a second cylindrical portion formed in a substantially round cylindrical shape) 87b provided in a radial direction outer side of the cylindrical portion 87a. The driving-side flange 87 further has a ring-shaped groove portion (a substantially ring-shaped groove portion, the second groove portion) 87c provided between the cylindrical portion 87a and the second cylindrical portion 87b.

The cylindrical portion 87a has a hollow portion 87e and a pair of groove portions 87f in the radial direction inner side. The hollow portion 87e and a pair of groove portions 87f respectively contain the connecting portion 86c and both end portions (88a and 88b) of the pin 88 of the coupling member 86 illustrated in FIGS. 7A to 7C.

The hollow portion 87e has an inner peripheral surface 87e1 of which central axis is the axis L1, and a bottom surface 87e2 which crosses the axis L1 (crosses perpendicularly in the present embodiment). The bottom surface 87e2 is disposed at a position to be penetrated by the axis L1. The inner peripheral surface 87e1 refers to an inner surface of an edge of the cylindrical portion 87a. The bottom surface 87e2 refers to a bottom portion which becomes a bottom of the hollow portion 87e.

The groove portions 87f are formed by cutting the inner peripheral surface 87e1. That is, the groove portions 87f are formed by recessing, in the radial direction outer side, the edge of the cylindrical portion 87a which forms the hollow portion 87e. The two groove portions 87f are formed along the axis L1, and are disposed at 180 degrees from each other via the axis L1. A bottom portion 87f3 which is a plane crossing the axis L1 (crossing perpendicularly in the present embodiment) is provided at an end of the non-driving side of the groove portion 87f. The bottom portion 87f3 is a portion which becomes a bottom of the groove portion 87f.

The groove portion 87f opens toward the side opposite to the side of the fixing portion 87d (the driving side) (the groove portion 87f is formed to reach an end of the cylindrical portion 87a), and a driving-side end of the groove portion 87f becomes an opening 87g. The groove portion 87f also has side surfaces 87f1 and 87f2 along the axis L1 direction, and opposite surfaces 87f4 which are parallel with the axis L1 and face each other in the direction of the axis L1.

As illustrated in FIG. 9E, a narrowed portion 87h of which width Z2 is narrower than a distance between the side surface 87f1 and the side surface 87f2 (a width Z1) is provided between the bottom portion 87f3 and the opening 87g.

Stopper portions 87h1 and 87h2 having a stopper angle θ1 to the axis L1 are provided on the non-driving side (the bottom portion 87f3 side) of the narrowed portion 87h. Inlet portions 87h3 and 87h4 having an insertion angle θ2 to the axis L1 are provided on the driving side of the narrowed portion 87h. The stopper portions 87h1 and 87h2, and the inlet portions 87h3 and 87h4 are provided to satisfy the relationship of the stopper angle θ1>the insertion angle θ2.

As illustrated in FIG. 9C, the second cylindrical portion 87b has a gear portion 87b1 on an outer peripheral side thereof for transmitting rotation to the developing roller 32 (see FIG. 2). The ring-shaped groove portion 87c has a supported portion 87c1 which is rotatably supported by a later-described bearing member 76.

(Attachment of Coupling Member and Pin)

Figure 10A:
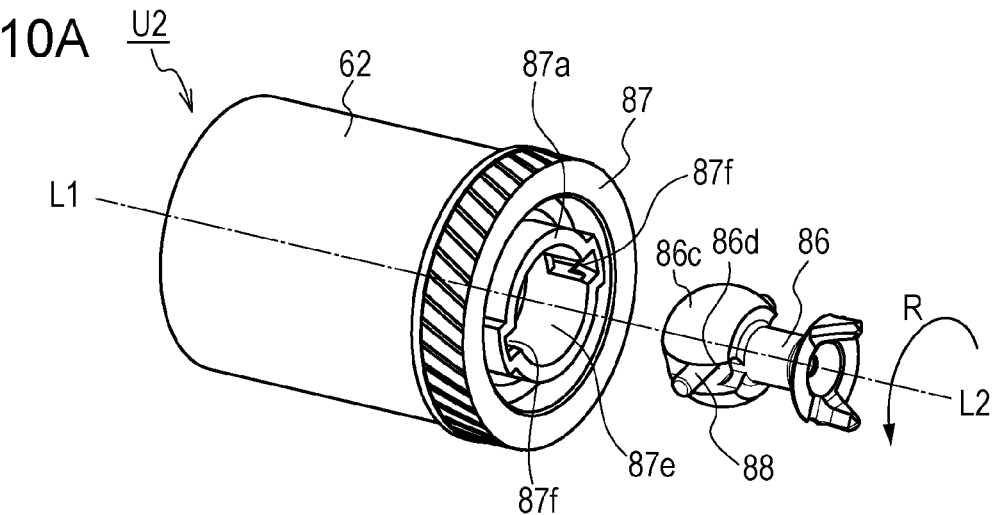
FIG. 10A is an explanatory view illustrating assembly of the coupling member and the pin to the drum cylinder unit.
Figure 10B:
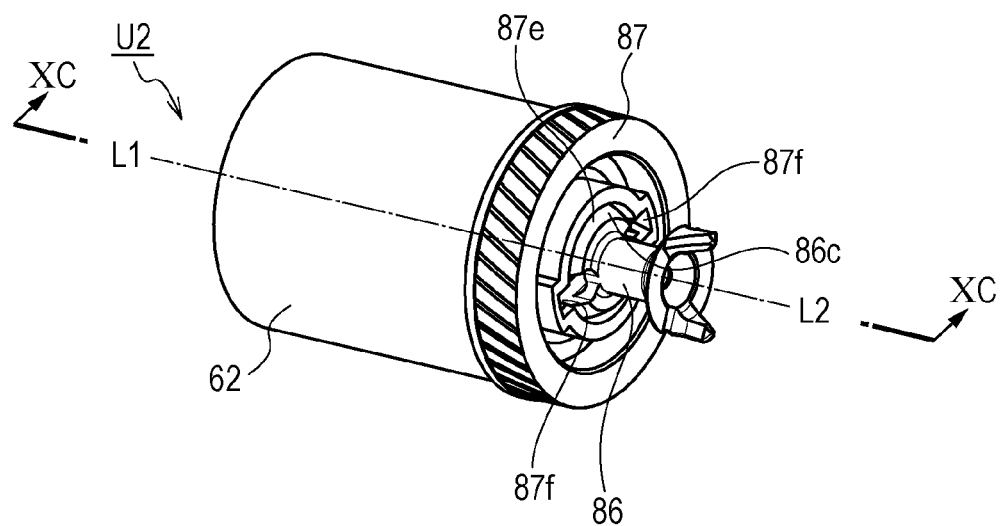
FIG. 10B is an explanatory view illustrating assembly of the coupling member and the pin to the drum cylinder unit.
Figure 10C:
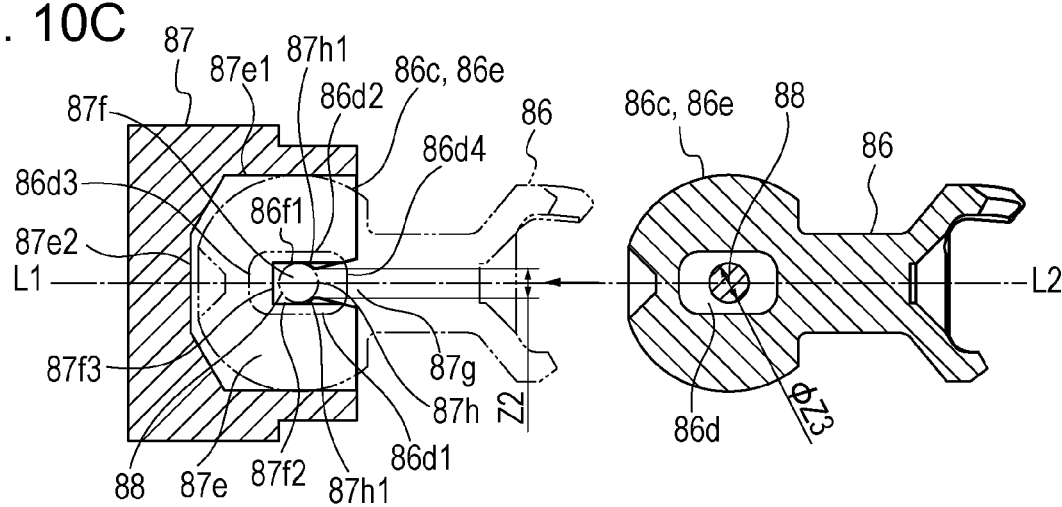
FIG. 10C is a cross-sectional view illustrating assembly of the coupling member and the pin to the drum cylinder unit.

A method for attaching the coupling member 86 and the pin 88 to the drum cylinder unit U2 is described with reference to FIGS. 10A to 10C and FIGS. 11A to 11C. FIGS. 10A to 10C are explanatory views illustrating assembly of the coupling member 86 and the pin 88 to the drum cylinder unit U2. FIG. 10A is a perspective view illustrating a state before assembly, and FIG. 10B is a perspective view illustrating a state after assembly. FIG. 10C is a XC cross-sectional view taken along a XC virtual plane (a plane in which axis of the pin 88 (see FIG. 10A) is the normal line) of FIG. 10B, and an area near the hollow portion 87e is enlarged. FIG. 10C illustrates states before and after assembly of the coupling member 86 and the pin 88, with the state before the assembly (FIG. 10A) illustrated by a solid line and the state after the assembly (FIG. 10B) illustrated by a virtual line (a dash-dot-dot line).

Figure 11A:
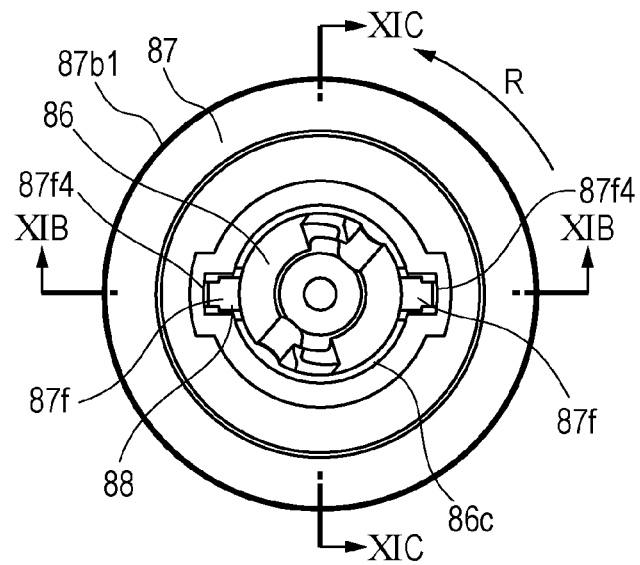
FIG. 11A is an explanatory view of the drum unit.
Figure 11B:
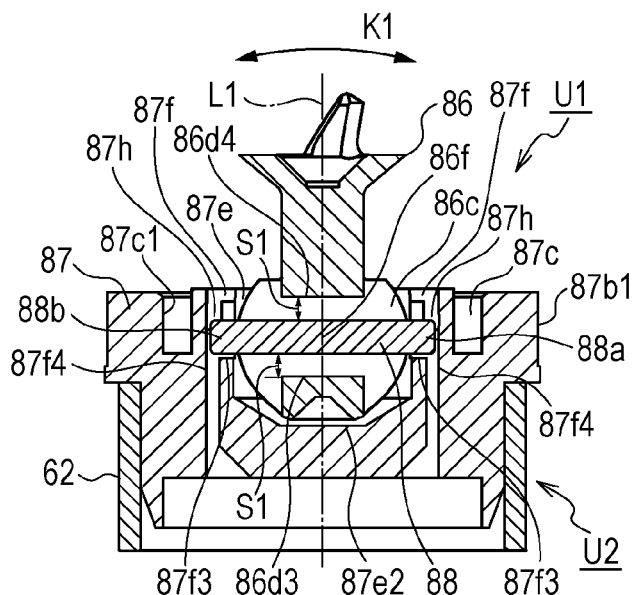
FIG. 11B is a cross-sectional view of the drum unit.
Figure 11C:
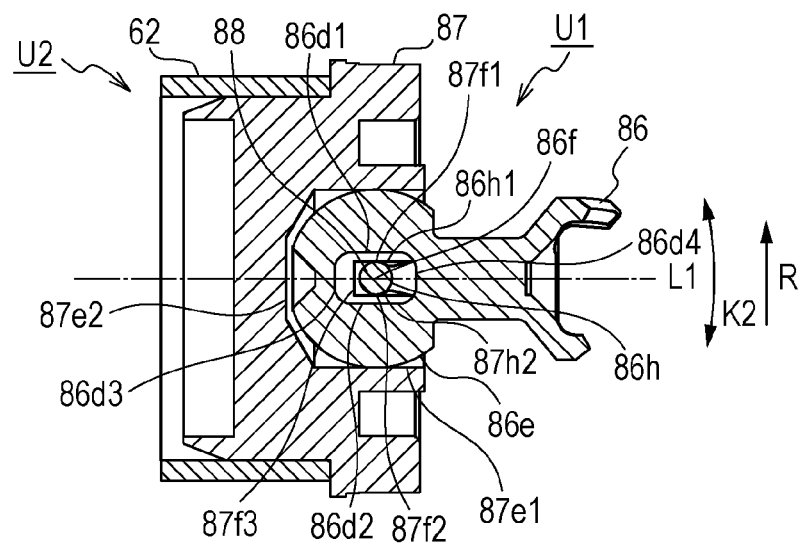
FIG. 11C is a cross-sectional view of the drum unit.

FIGS. 11A to 11C are explanatory views (of the drum unit U1) illustrating a state in which the coupling member 86 and the pin 88 are assembled to the drum cylinder unit U2. FIG. 11A is a front view seen from the driving side, FIG. 11B is a XIB cross-sectional view taken along line XIB-XIB of FIG. 11A, and FIG. 11C is a XIC cross-sectional view taken along line XIC-XIC of FIG. 11A.

When the coupling member 86 and the pin 88 are assembled to the drum cylinder unit U2, as illustrated in FIG. 10A, the pin 88 and the coupling member 86 are inserted in the driving-side flange 87 along the direction of axis L1 with the pin 88 inserted in the through hole portion 86d. The hollow portion 87e is opened outside (the driving side) of the drum cylinder 62 in a direction of axis L1, i.e., the right side of FIG. 10A. The coupling member 86 is inserted in a direction of axis L1 from the right into the hollow portion 87e.

The connecting portion 86c is inserted in the hollow portion 87e and the pin 88 is inserted in the groove portions 87f with the phases in the rotational direction R of the pin 88 (both end portions 88a and 88b thereof) and the groove portions 87f aligned.

The two groove portions 87f in which ends of the pins 88 are respectively inserted are disposed symmetrically about the center of the cylindrical portion 87a (i.e., the axis L1).

During insertion of the pin 88 in the groove portion 87f, as illustrated in FIG. 10C, resistance is produced during insertion of the pin 88 in the groove portion 87f since the width Z2 of the narrowed portion 87h is smaller than a diameter φZ3 of the pin 88. The coupling member 86 and the pin 88 are inserted while the portion near the narrowed portion 87h is elastically deformed by applying insertion force which overcomes the resistance to the pin 88. Then, the pin 88 passes through the narrowed portion 87h, and insertion of the pin 88 in the groove portion 87f and insertion of the connecting portion 86c in the hollow portion 87e are completed.

As illustrated in FIGS. 11A to 11C, the coupling member 86 and the pin 88 are assembled to the drum cylinder unit U2, and the drum unit U1 is completed. At this time, the coupling member 86 is positioned in the radial direction with the connecting portion 86c supported by the inner peripheral surface 87e1. The coupling member 86 is not slipped off on the non-driving side by the bottom surface 87e2 with the connecting portion 86c being in contact with the bottom surface 87e2. As described above, the bottom surface 87e2 is disposed at a position to be penetrated by the axis L1, but the bottom surface 87e2 may be disposed at a position not to be penetrated by the axis L1. In this arrangement, a configuration in which the bottom surface 87e2 is inclined to the axis L1 is more desirable than a configuration in which the bottom surface 87e2 crosses perpendicularly the axis L1. This is because the former can make the bottom surface 87e2 be parallel with the surface of the connecting portion 86c as much as possible and the connecting portion 86c can be supported more stably. Since the through hole portion 86d (a non-driving-side end surface 86d3 thereof, see FIG. 11C) is in contact with the pin 88, the coupling member 86 is not slipped off on the driving side. Since both the side surfaces (86d1 and 86d2) of the through hole portion 86d are in contact with the pin 88, the coupling member 86 is positioned in the rotational direction R (with little play). The pin 88 is not slipped off in the direction of the axis L1 by the bottom portion 87f3 and the narrowed portions 87h (the stopper portions 87h1 and 87h2 thereof), and is positioned in the axial direction of the pin 88 by the opposite surfaces 87f4. The pin 88 is positioned by both the side surfaces 87f1 and 87f2 of the groove portion 87f also in the rotational direction R. When rotation in the rotational direction R is input in the coupling member 86, the rotational force is transmitted to the side surface 87f1 of the groove portion 87f via the pin 88. That is, the side surface 87f1 functions as a portion to which the rotational force is transmitted.

Since the relationship of the stopper angle θ1>the insertion angle θ2 is satisfied, insertion force necessary to insert the pin 88 in the groove portions 87f can be made smaller than the force necessary to remove the pin 88 from the groove portions 87f. Therefore, insertion force during assembly of the pin 88 to the driving-side flange 87 can be reduced, and the pin 88 can be less easily slipped out of the driving-side flange 87. Only one of the two groove portions 87f may have the narrowed portion 87h to prevent slipping off of the pin 88. However, providing the narrowed portions 87h in both of the two groove portions 87f is desirable from the viewpoint of reliably preventing slipping off of the pin 88.

With the configuration described above, the coupling member 86 and the pin 88 are assembled so that these parts are not slipped out of the drum cylinder unit U2 and that rotational force is transmitted to the driving-side flange 87 from the coupling member 86. Since the cylindrical inner peripheral surface 87e1 supports the spherical surface 86e, the coupling member 86 can be inclined about the spherical center 86f with respect to the driving-side flange 87 (the directions of K1, K2, and synthesized direction of these in FIGS. 11A and 11B). To enable the coupling member 86 to be inclined in the direction of K1, a gap S1 in the direction of axis L2 is provided in the pin 88 and the through hole portion 86d (the non-driving-side end surface 86d3 and a driving-side end surface 86d4) (see also FIGS. 7A to 7C).

(Configuration of Cleaning Unit)

Figure 12:
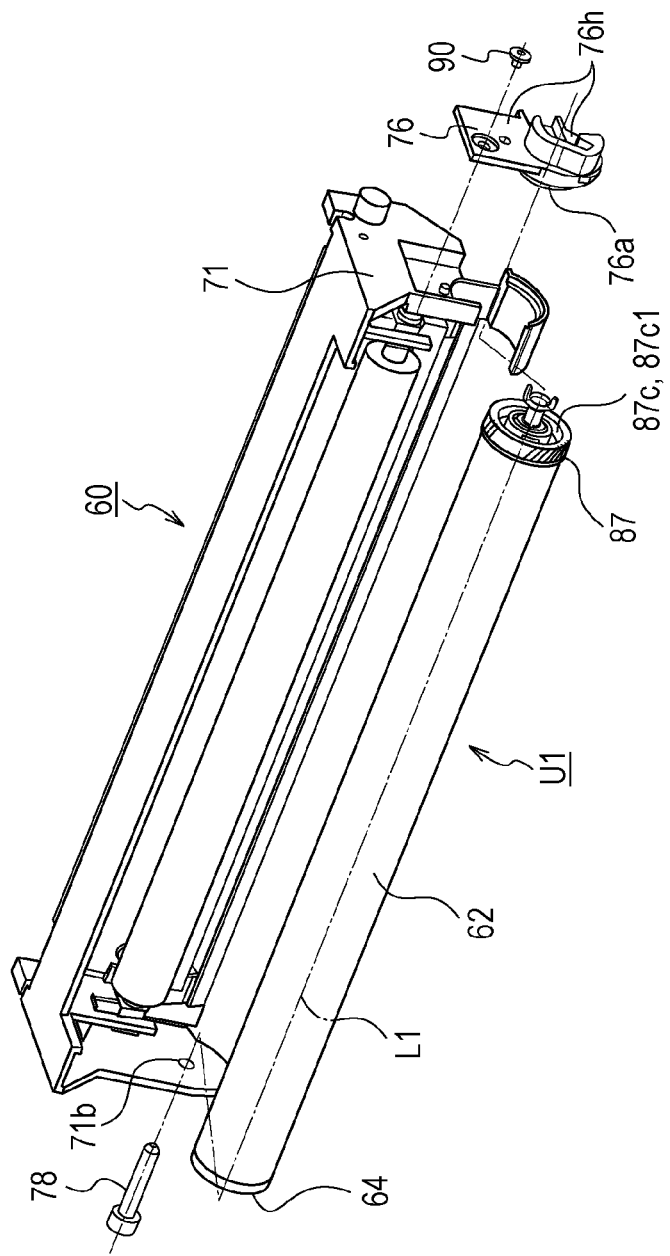
FIG. 12 is an exploded perspective view of a cleaning unit.

A method for assembling the drum unit U1 to the cleaning unit 60 is described hereafter with reference to FIG. 12. FIG. 12 is an exploded perspective view of the cleaning unit 60.

As illustrated in FIG. 12, on the non-driving side of the cleaning unit 60, a bearing portion 64b (see FIG. 8B) of the non-driving-side flange 64 of the drum unit U1 is rotatably supported by a drum shaft 78. The drum shaft 78 is fixed to a support portion 71b provided on the non-driving side of the cleaning frame 71 by press-fitting.

A bearing member 76 which is in contact with and supports the driving-side flange 87 is provided on the driving side of the cleaning unit 60. A wall surface (a planar portion) 76h of the bearing member 76 is fixed to the cleaning frame 71 with a screw 90. A support portion 76a of the bearing member 76 fittingly supports the ring-shaped groove portion 87c of the driving-side flange 87. In this manner, the drum unit U1 is rotatably supported by the cleaning frame 71 via the drum shaft 78 and the bearing member 76.

As described above, each portion of the driving-side flange 87 can be disposed as follows by providing the ring-shaped groove portion 87c in the driving-side flange 87.

Figure 21:
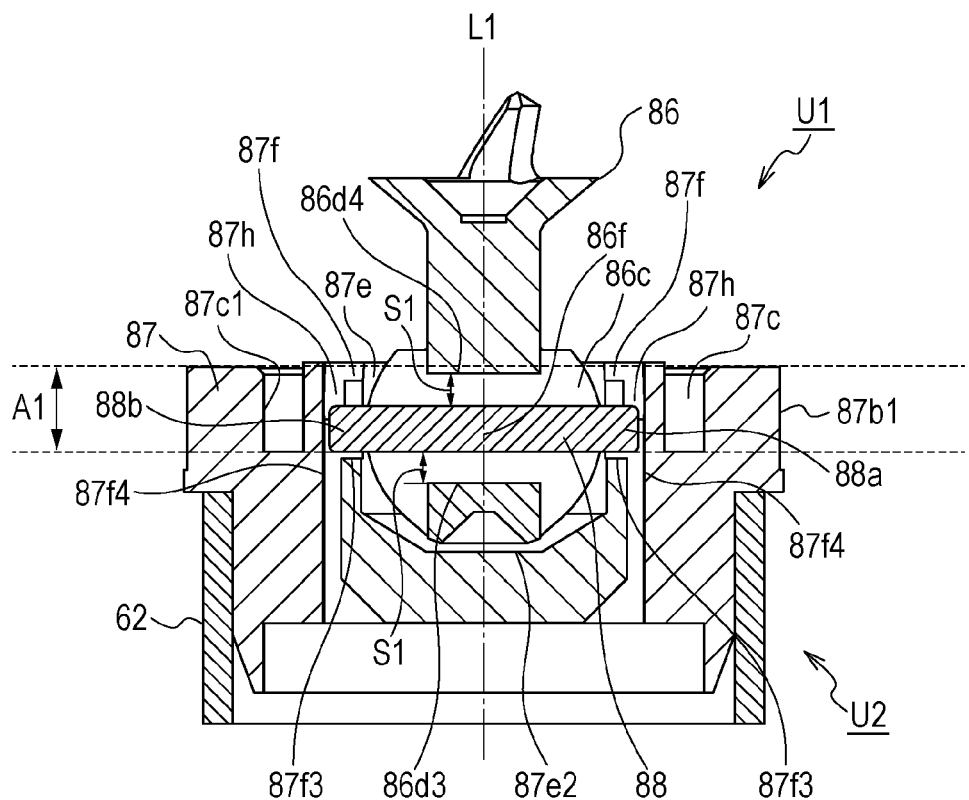
FIG. 21 is an explanatory view of the driving-side flange and the pin.

That is, a portion supported by the bearing member 76 (the support portion 76a thereof) (the supported portion 87c1) can be overlapped by the gear portion 87b1, the hollow portion 87e (for these, see FIG. 11B), and the groove portion 87f in the direction of the axis L1. That is, as illustrated in FIG. 21, the positions of the ring-shaped groove portion 87c (the supported portion 87c1), the gear portion 87b1, and the hollow portion 87e overlap in a region A1 along the axis L1. Therefore, compared with a case in which the supported portion supported by the bearing member 76 is provided on the outer side in the direction of the axis L1 of the gear portion 87b1 and the hollow portion 87e, the size of the cartridge B can be reduced in the direction of the axis L1. Since the gear portion 87b1 and the groove portion 87f overlap in the direction of the axis L1, force received on the side surface 87f1 of the groove portion 87f (see FIG. 9E) can be stably transmitted to the gear portion 87b1. With this configuration, regarding the radial direction about the axis L1, the gear portion 87b1 is disposed outside of the ring-shaped groove portion 87c, and the ring-shaped groove portion 87c is disposed outside of the hollow portion 87e and the groove portion 87f.

Although the bearing member 76 is fixed to the cleaning frame 71 with the screw 90 in the present embodiment, the bearing member 76 may be fixed with an adhesive or fused resin. Alternatively, the cleaning frame 71 and the bearing member 76 may be integrated with each other.

The cleaning unit 60 and the developing unit 20 are connected as described above, and the cartridge B is completed.

As described above, according to the configuration of the present embodiment, the coupling member 86 and the pin 88 can be assembled to the drum cylinder unit U2 from the outer side of the driving side (in the axial direction outer side with respect to the photoconductive drum: the right side in FIG. 10A). Therefore, the assembly process of the cartridge B can be simplified for the reason described below.

As described above, since the coupling member 86 can be inclined, there is a possibility of collision of the coupling member 86 with an assembly tool or parts to be assembled in the assembly process of the cartridge B. Therefore, in the downstream processes of the assembly of the coupling member 86, it is necessary to regulate inclination of the coupling member 86 with the hand, a tool, a device, and the like. Once the coupling member 86 is assembled to the driving-side flange 87, the downstream processes of the assembly of the cartridge B must be conducted while controlling the inclination of the coupling member 86. That is a burden to the operating process.

Therefore, if assembly of the coupling member 86 can be performed in the downstream as much as possible in the assembly process of the cartridge B, the number of processes in which inclination of the coupling member 86 needs to be controlled can be reduced.

With the configuration of the present embodiment, the coupling member 86 can be attached to the driving-side flange 87 after the driving-side flange 87 is fixed to the drum cylinder 62. In this case, compared with a case in which the coupling member 86 is attached to the driving-side flange 87 before the driving-side flange 87 is attached to the drum cylinder 62, the process of fixing the driving-side flange 87 to the drum cylinder 62 can be simplified. That is, since there is no coupling member 86 in the driving-side flange 87, the coupling member 86 does not hinder the operation when the driving-side flange 87 is fixed to the drum cylinder 62.

Alternatively, the coupling member 86 and the pin 88 may be assembled after the drum cylinder unit U2 is assembled to the cleaning unit 60. In this case, the assembly process of the drum cylinder unit U2 to the cleaning unit 60 can also be simplified. Alternatively, the coupling member 86 and the pin 88 may be assembled after the cleaning unit 60 and the developing unit 20 are connected.

Although slipping off of the coupling member 86 to the non-driving side is stopped by the bottom surface 87e2 in the present embodiment, slipping off may be stopped by the pin 88 and the through hole portion 86d (the driving-side end surface 86d4 thereof) like the stopper to the driving side. However, since the gap S1 is provided between the pin 88 and the through hole portion 86d (the driving-side end surface 86d4 thereof) as described above, the configuration in which slipping off is stopped by the bottom surface 87e2 as in the present embodiment can position the coupling member 86 precisely.

Figure 13A:
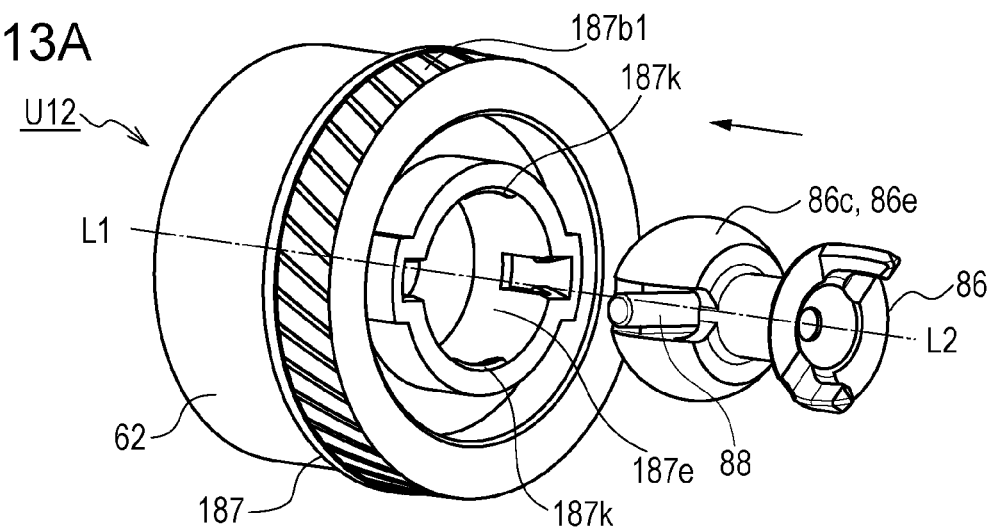
FIG. 13A is an explanatory view of an overhung portion of a driving-side flange.
Figure 13B:
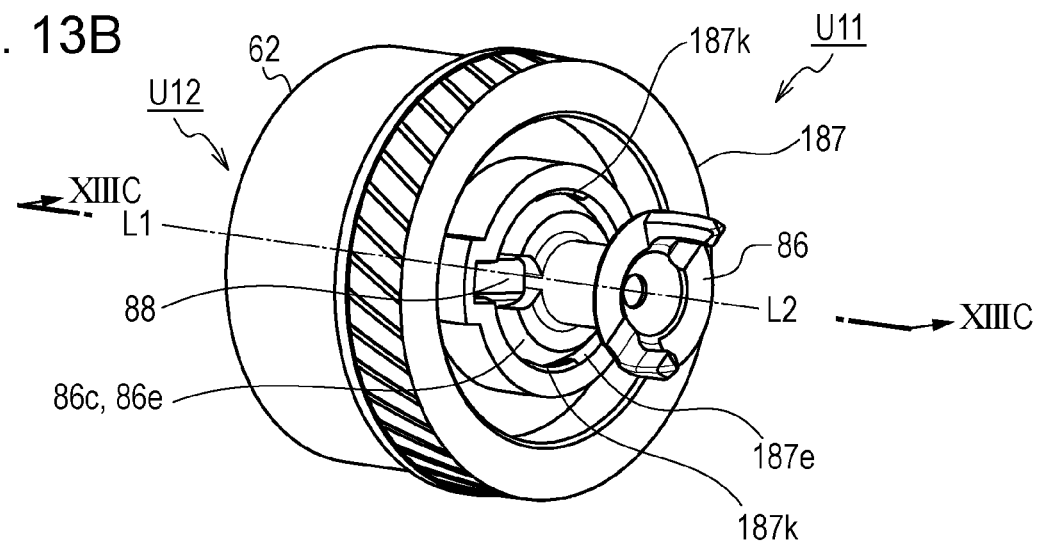
FIG. 13B is an explanatory view of the overhung portion of the driving-side flange.
Figure 13C:
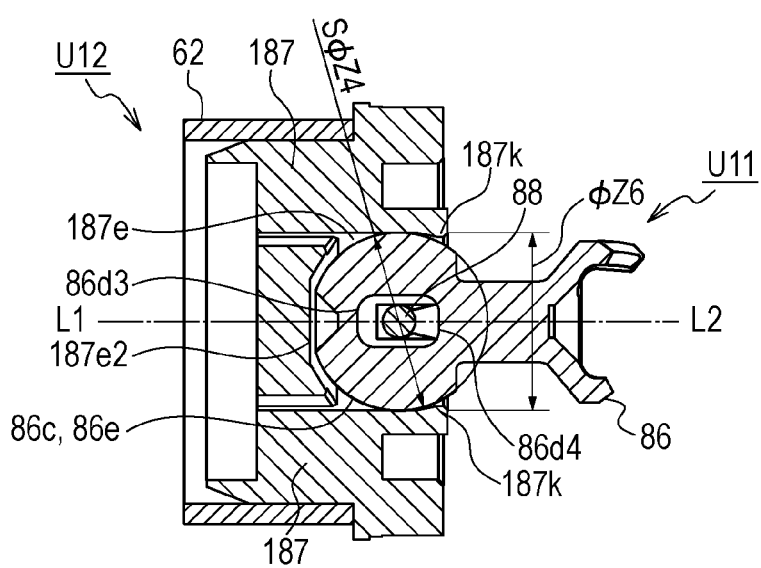
FIG. 13C is a cross-sectional view of the overhung portion of the driving-side flange.

As illustrated in FIGS. 13A to 13C, overhung portions 187k may be provided in the driving-side flange 187 for the stopper of the coupling member 86 to the driving side.

In this case, slipping off of the coupling member 86 on the driving side can be stopped by setting a distance φZ6 between the overhung portions 187k to be smaller than a diameter φZ4 of the connecting portion 86c.

The overhung portions 187k are projections projecting inwardly (toward the center of the cylindrical portion, in the radial direction inner side) of the hollow portion 187e from an inner wall of the hollow portion 187e (an inner peripheral surface of the cylindrical portion). The overhung portions 187k are in contact with the coupling member 86 and prevent the coupling member 86 from moving outside the drum cylinder 62 (right of FIG. 13C). That is, since the overhung portions 187k are caught in the coupling member 86, slipping off of the coupling member 86 from the driving-side flange 187 is prevented. The driving-side flange 187 has a gear portion 187b1 which is the same as the gear portion 87b1.

Therefore, compared with a case in which slipping off to the driving side is stopped by the pin 88 and the through hole portion 86d (the non-driving-side end surface 86d3 thereof), the coupling member 86 can be positioned more precisely.

Figure 14A:
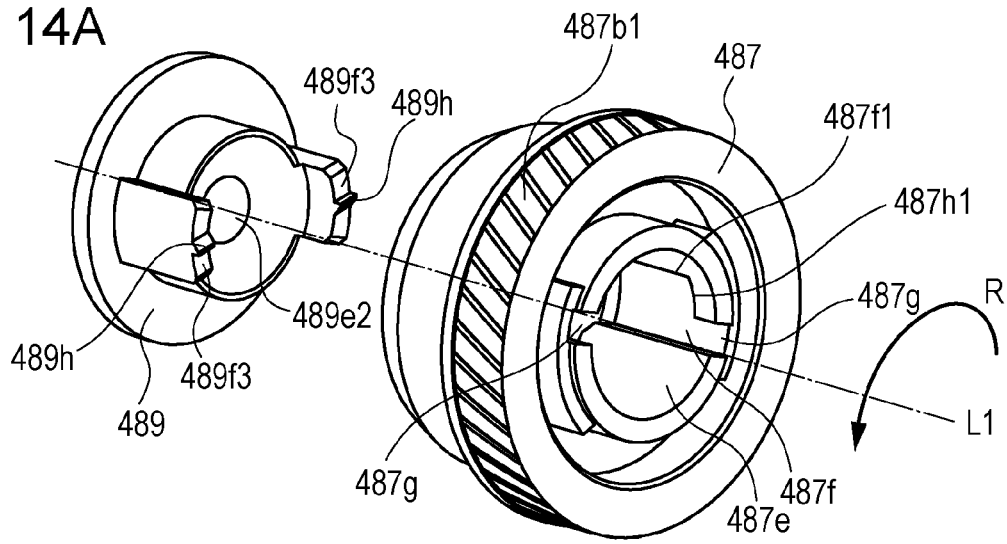
FIG. 14A is an explanatory view of a driving-side flange and a lid member.
Figure 14B:
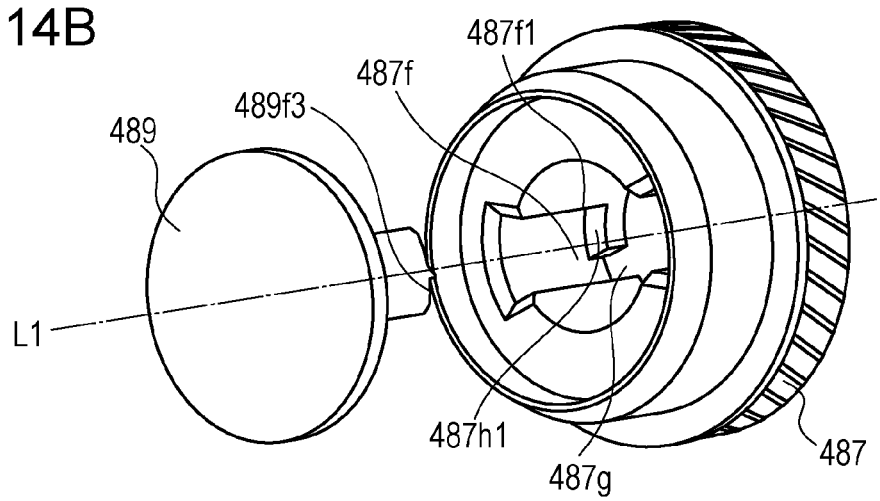
FIG. 14B is an explanatory view of the driving-side flange and the lid member.
Figure 14C:
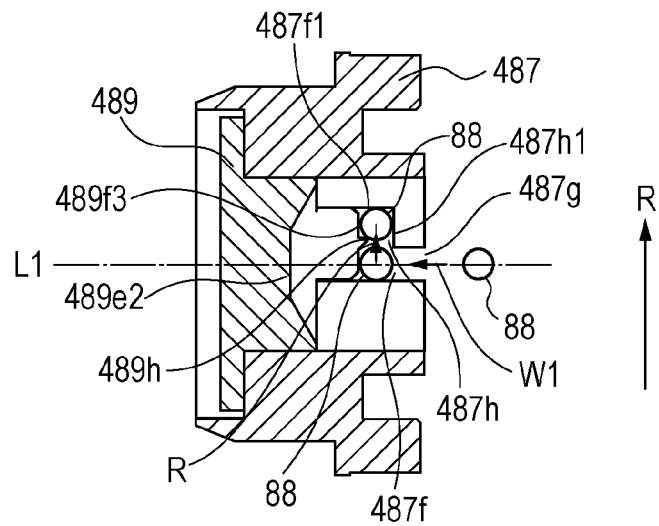
FIG. 14C is a cross-sectional view of the driving-side flange and the lid member.

Although the driving-side flange 87 is an integrated member in the present embodiment, two parts may be integrated: this exemplary configuration is described with reference to FIGS. 14A to 14C. FIGS. 14A to 14C are explanatory views of a configuration in which a lid member 489 is provided separately from a driving-side flange 487. FIGS. 14A and 14B are exploded perspective views and FIG. 14C is a cross-sectional view of a state in which the pin 88 is assembled.

In the exemplary configuration illustrated in FIGS. 14A to 14C, the lid member 489 having a bottom surface 489e2 and a bottom portion 489f3 is fixed to the driving-side flange 487. The bottom surface 489e2 forms a bottom of the hollow portion 487e when the lid member 489 is fixed to the driving-side flange 487. The bottom portion 489f3 forms a part of a groove portion 487f. The driving-side flange 487 has a gear portion 487b1 which is the same as the gear portion 87b1.

With this configuration, a hole 87m (see FIG. 9C) for forming the narrowed portion 87h illustrated in FIGS. 9A to 9E on the mold can be omitted, and molding of the driving-side flange 487 becomes easy. When the lid member 489 is provided, slipping off of the pin 88 can also be stopped by the configuration illustrated in FIG. 14C. In this exemplary configuration, the narrowed portion 487h is formed by a projection 489h projecting from the bottom surface 489f3 of the lid member 489 and a stopper surface 487h1 of the driving-side flange 487. In this case, as illustrated in FIG. 14C, the pin 88 is first inserted in the direction of arrow W1 in the groove portion 487f from an opening 487g. Then, by making the pin 88 rotate with the coupling member 86 (not illustrated) in the rotational direction R, the pin 88 overrides the narrowed portion 487h formed by the projection 489h and the stopper surface 487h1, whereby assembly of the coupling member 86 and the pin 88 is completed.

Figure 22:
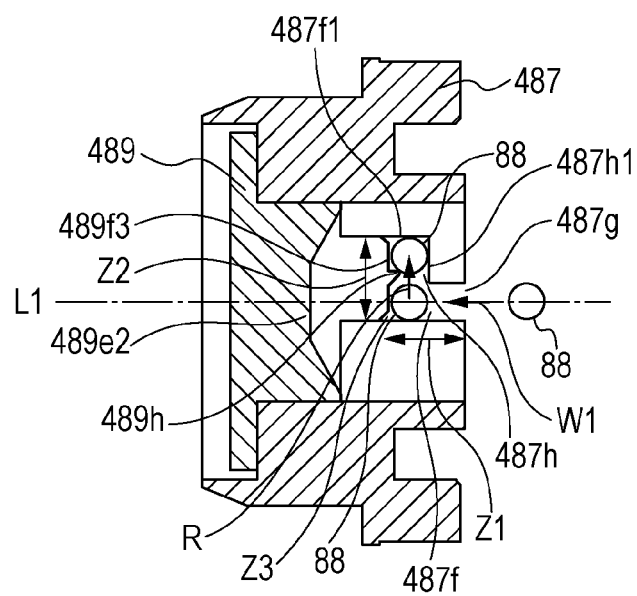
FIG. 22 is an explanatory view of the driving-side flange.

As illustrated in FIG. 22, the groove portion 487f has a bent portion Z3. That is, the groove portion 487f has a first portion Z1 extending in the axial direction of the photoconductive drum, and a second portion Z2 located closer to the bottom surface 489f3 than the first portion Z1 does and extending in a circumferential direction of the cylindrical portion. The bent portion Z3 is a portion located between the first portion Z1 and the second portion Z2, and at which the direction in which the groove portion 487f extends changes, i.e., a portion at which the groove portion 487f bends. The narrowed portion 487h is located in the second portion Z2 of the groove portion 487f.

Second Embodiment

A second embodiment according to the present invention is described with reference to FIGS. 15A to 16B. Since the configuration of the present embodiment is the same as that of the first embodiment except for a driving-side flange 287, description of the configuration is omitted. Regarding the driving-side flange 287, since configurations other than those of the groove portion 287f and the narrowed portion 287h are the same as those of the first embodiment, description thereof is omitted.

Figure 15A:
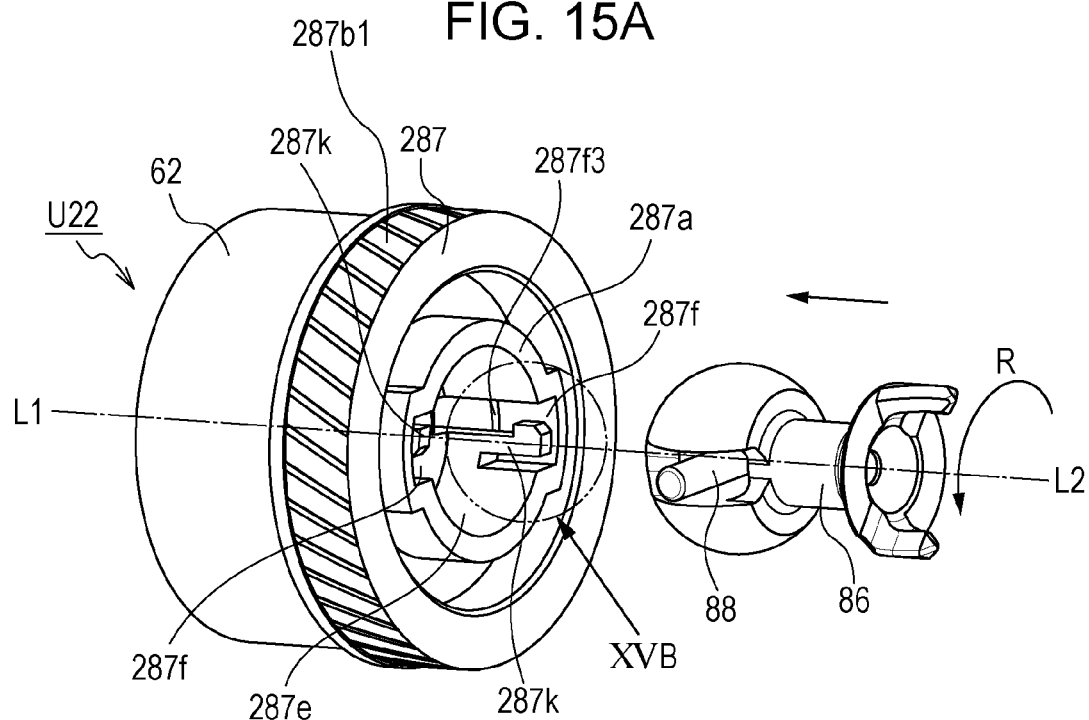
FIG. 15A is an explanatory perspective view of a drum cylinder unit.
Figure 15B:
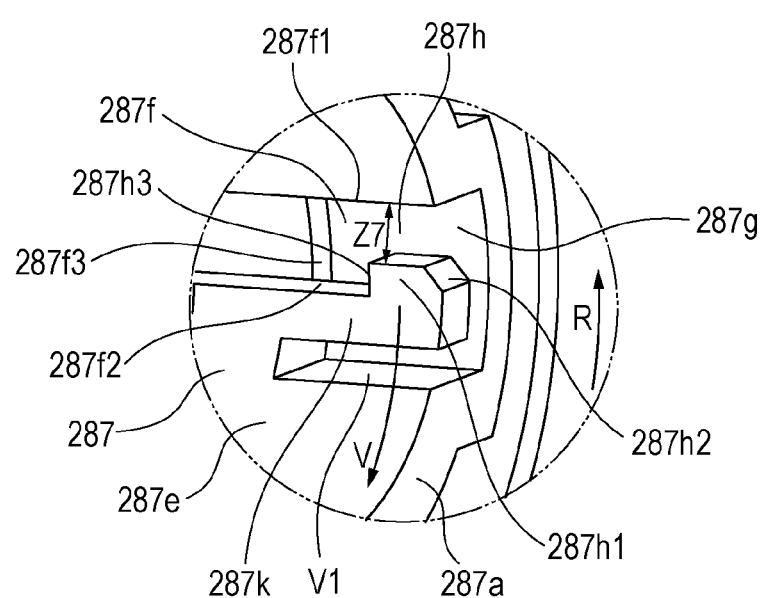
FIG. 15B is an enlarged view of the drum cylinder unit.

FIGS. 15A and 15B are perspective explanatory views of a drum cylinder unit U22 provided with a driving-side flange 287 according to the present embodiment. As illustrated in FIG. 15A, the driving-side flange 287 has a pair of groove portions 287f opening to the driving side (an outer side of the photoconductive drum in the axial direction) in an opening 287g as in the first embodiment. The pair of groove portions 287f are formed at an edge of a cylindrical portion 287a (an inner peripheral surface which forms the hollow portion 287e).

Here, as illustrated in FIG. 15B, side surfaces 287f2 (in the upstream of the rotational direction R) which do not function as the portions to which the rotational force is transmitted in both the side surfaces (287f1 and 287f2) of the groove portion 287f are formed as parts of elastic deformation portions 287k. The elastic deformation portions 287k extend on the driving side from the bottom portion 287f3, and are not continuously connected with the cylindrical portion 287a. In addition, the elastic deformation portions 287k and the cylindrical portion 287a have a gap V1 also in the direction of arrow V. Therefore, the elastic deformation portion 287k easily elastically deforms in the direction of arrow V of FIG. 15B starting at the bottom portion 287f3. From the side surface 287f2, a projection 287h1 projecting toward an opposite side surface 287f1 is provided. A narrowed portion 287h having a distance Z7 narrower than a diameter φZ3 of the pin 88 is formed between the projection 287h1 and the side surface 287f1. A sloped portion 287h2 inclined to the axis L1 is provided on the driving side (the opening 287g side) of the projection 287h1, and a stopper portion 287h3 which perpendicularly crosses the axis L1 is provided on the non-driving side (the bottom portion 287f3 side). The driving-side flange 287 has the gear portion 287b1 which is the same as the gear portion 87b1.

When the coupling member 86 and the pin 88 are assembled to the driving-side flange 287, the pin 88 is brought into contact with the sloped portion 287h2 and the elastic deformation portion 287k deforms in the direction of arrow V. Then the narrowed portion 287h is expanded to let the pin 88 pass therethrough. Since the stopper portion 287h3 perpendicularly crosses the axis L1, the elastic deformation portion 287k less easily deforms in the direction of arrow V even if the pin 88 tries to pass through on the driving side.

In the present embodiment, as described above, the elastic deformation portion 287k is provided so that the narrowed portion 287h expands easily when the pin 88 is inserted. As compared with a case in which no elastic deformation portion 287k is provided (the first embodiment), a burden during assembly of the pin 88 to the drum cylinder unit U22 can be reduced.

In contrast to the present embodiment, the elastic deformation portion may be provided on the side of the side surface 287f1 which functions as the portion to which the rotational force is transmitted. In that case, however, there is a possibility that the elastic deformation portion deforms when rotational force is transmitted from the pin 88, and the pin 88 overrides the projection 287h1 and slips off. Therefore, it is more suitable to provide the elastic deformation portion on the side of the side surface 287f2 as in the present embodiment.

Figure 16A:
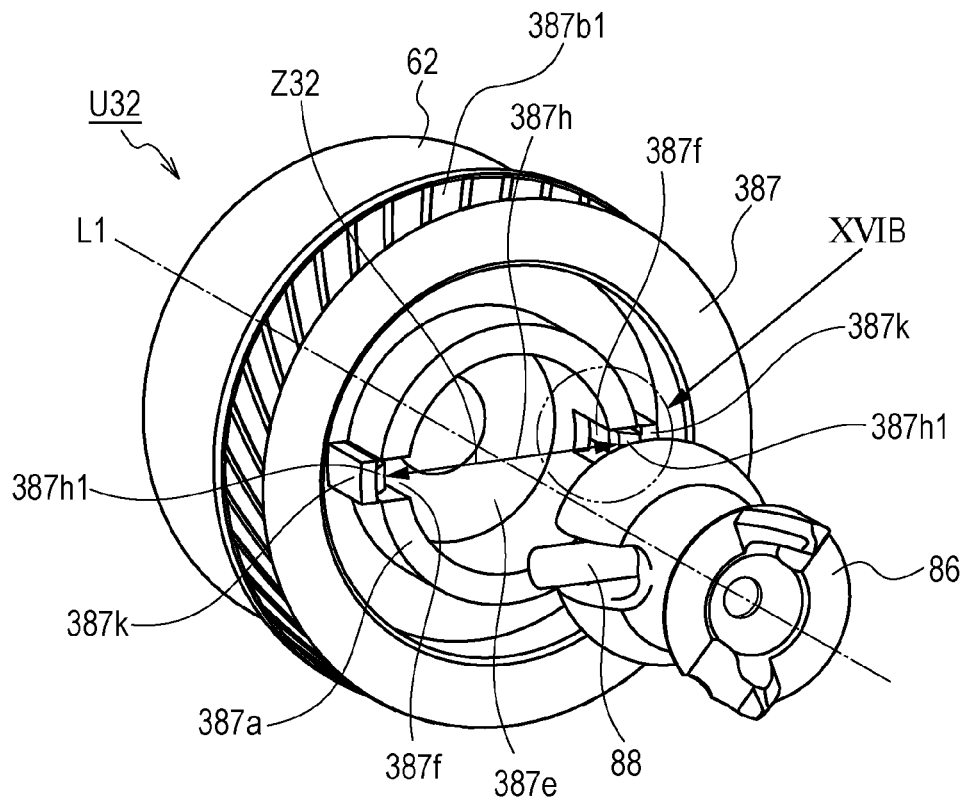
FIG. 16A is an explanatory perspective view of a drum cylinder unit.
Figure 16B:
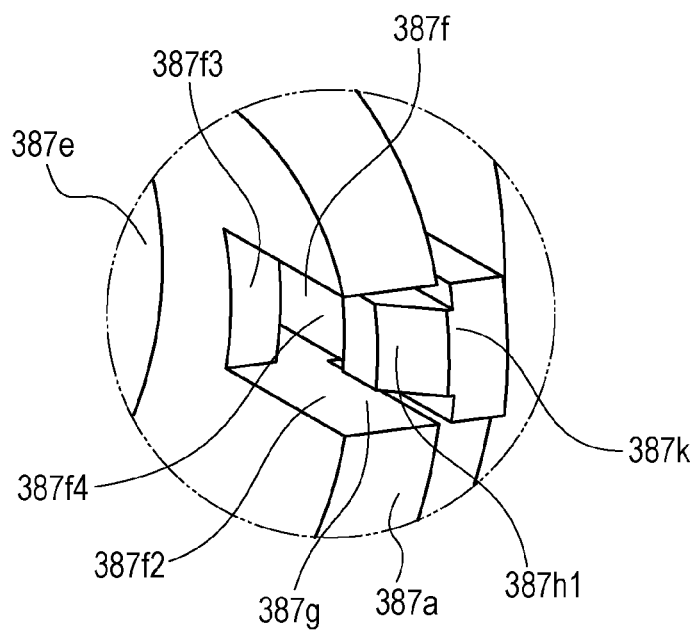
FIG. 16B is an enlarged view of the drum cylinder unit.

Other forms of the present embodiment are described with reference to FIGS. 16A and 16B. FIGS. 16A and 16B are perspective explanatory views of a drum cylinder unit U32 including a driving-side flange 387.

In the form of the driving-side flange 387 illustrated in FIGS. 16A and 16B, the driving-side flange 387 has a cylindrical portion 387a, a hollow portion 397e, a narrowed portion 387h, and the like. The driving-side flange 387 is configured with the elastic deformation portions 387k which are not continuously connected with the cylindrical portion 387a being provided in an opposite surface 387f4 side opposite to the axis L1, and make the projections 387h1 project toward the axis L1 from the opposite surface 387f4. In this case, the width Z32 (the distance between two opposite projections 387h1) illustrated in FIGS. 16A and 16B is defined as the narrowed portion 387h, and the projection 387h1 is provided so that the width Z32 becomes smaller than the full length Z5 (see FIGS. 7A to 7C) of the pin 88. The driving-side flange 387 has a gear portion 387b1 which is the same as the gear portion 87b1.

Third Embodiment

A third embodiment according to the present invention is described with reference to FIGS. 17A to 17D. Since the configuration of the present embodiment is the same as that of the first embodiment except for a driving-side flange 587 (687), description of the configuration is omitted. Regarding the driving-side flange 587 (687), since configurations other than that of a groove portion 587f (687f) are the same as those of the first embodiment, description thereof is omitted.

Figure 17A:
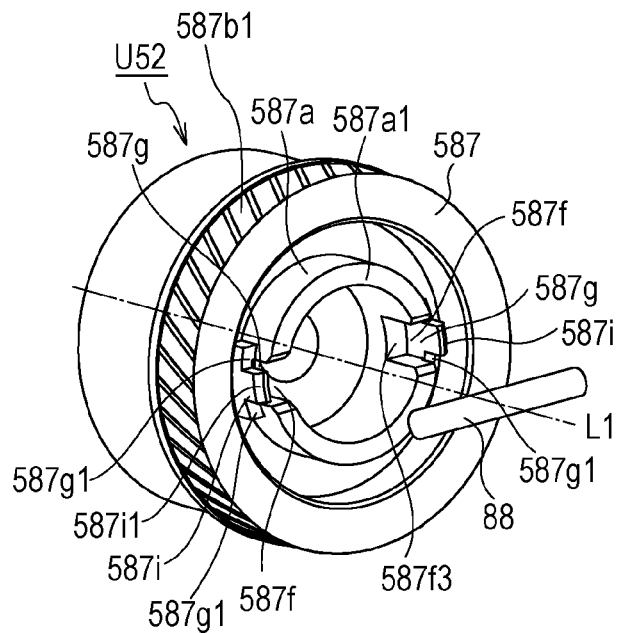
FIG. 17A is an explanatory perspective view of a method for fixing a driving-side flange and the pin.
Figure 17B:
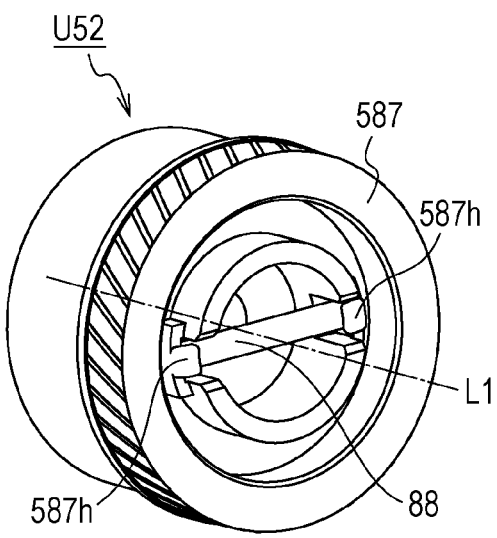
FIG. 17B is an explanatory perspective view of a method for fixing the driving-side flange and the pin.
Figure 17C:
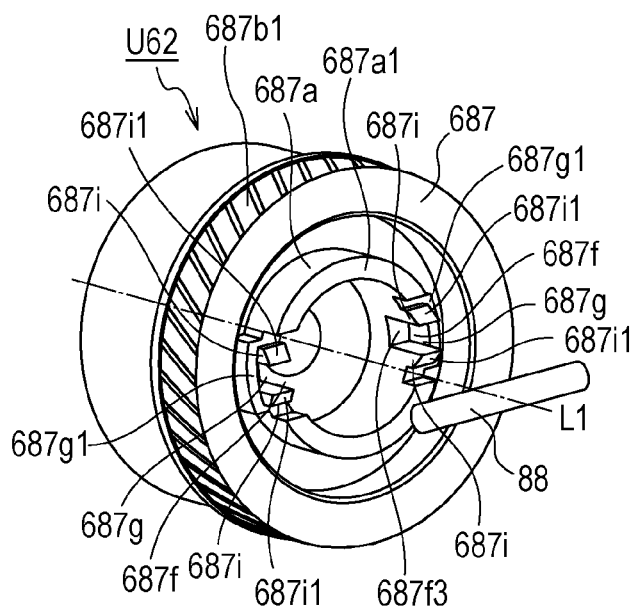
FIG. 17C is an explanatory perspective view of a method for fixing the driving-side flange and the pin.
Figure 17D:
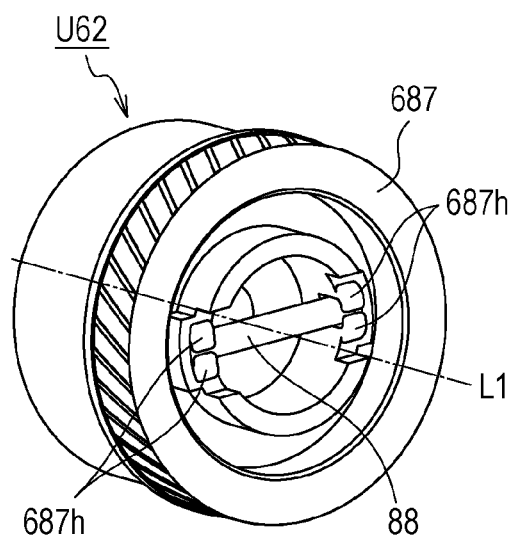
FIG. 17D is an explanatory perspective view of a method for fixing the driving-side flange and the pin.

FIGS. 17A to 17D are perspective explanatory views of a method for fixing the driving-side flange 587, the driving-side flange 687, and the pin 88 in the present embodiment. FIGS. 17A and 17C are perspective views of the driving-side flange 587 and the driving-side flange 687 illustrating examples of the present embodiment. FIGS. 17B and 17D are perspective views illustrating the state in which slipping off of the pin 88 is stopped after the pin 88 is inserted in the driving-side flange 587 (687) of FIGS. 17A and 17C.

As illustrated in FIGS. 17A and 17C, the cylindrical portion 587a (687a) of the driving-side flange 587 (687) has a pair of groove portions 587f (687f). An opening surface 587g1 (687g1) located further driving side than the bottom portion 587f3 (687f3) is provided in the radial direction outer side of the groove portion 587f (687f). The driving-side flange 587 (687) has a gear portion 587b1 (687b1) which is the same as the gear portion 87b1.

In the present embodiment, the groove portion 587f (687f) is defined to reach the opening surface 587g1 (687g1) in the direction of the axis L1. An opening 587g (687g) which becomes a driving-side end of the groove portion 587f (687f) is located at the same position as that of the opening surface 587g1 (687g1) in the direction of the axis L1. A protruding portion 587i (687i) protruding on the driving side is provided in the opening surface 587g1 (687g1) with a gap between the cylindrical portion 587a (687a). A sloped portion 587i1 (687i1) inclined to the axis L1 so that the normal line faces the direction opposite to the direction of the groove portion 587f (687f) is provided in the protruding portion 587i (687i). The protruding portion 587i (687i) is made of thermoplastic resin, such as polyacetal. Portions of the driving-side flange 587 (687) other than the protruding portion 587i (687i) may be made of the same material as that of the protruding portion 587i (687i) or another material formed integrally by two-color molding or the like.

After inserting the pin 88 in the groove portion 587f (687f) of the driving-side flange 587 (687), pressure and heat in the direction which perpendicularly crosses the sloped portion 587i1 (687i1) are applied to the protruding portion 587i (687i) made of thermoplastic resin (thermally deformable resin). Then, as illustrated in FIGS. 17B and 17D, the protruding portion 587i (687i) deforms toward the groove portion 587f (687f) to form a stopper portion 587h (687h). The opening 587g (687g) is thus closed and slipping off of the pin 88 can be stopped. The protruding portion 587i (687i) is a thermally deformable portion which prevents the pin 88 from moving in the axial direction outer side (right in FIG. 17D) of the photoconductive drum when it deforms thermally.

As described above, according to the present embodiment, since the coupling member 86 and the pin 88 can be assembled from the outer side on the driving side of the drum cylinder unit U52, assemblability of the drum cylinder unit U52 improves as in the first and second embodiments.

Since the driving-side flange 587 is producible in a simpler shape compared with the above-described embodiments, mold fabrication becomes easier and part precision after molding is stabilized easily.

Figure 18A:
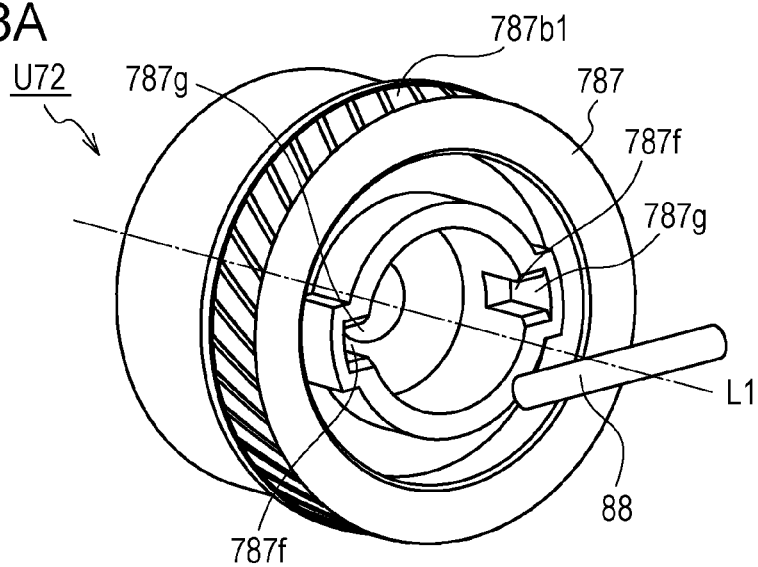
FIG. 18A is an explanatory view of a pin stopper structure.
Figure 18B:
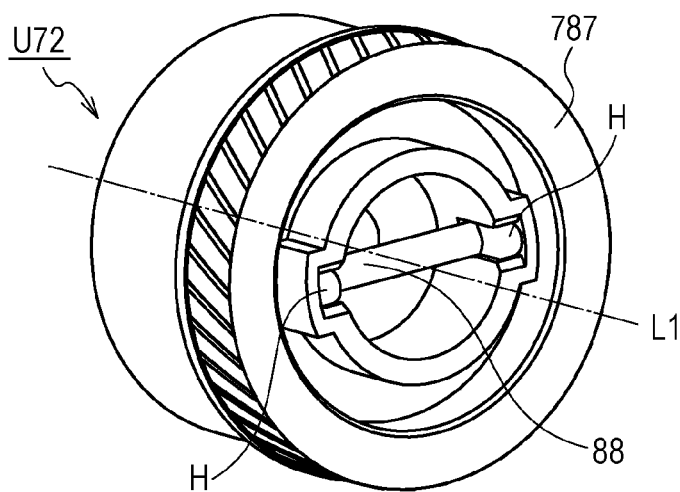
FIG. 18B is an explanatory view of the pin stopper structure.
Figure 18C:
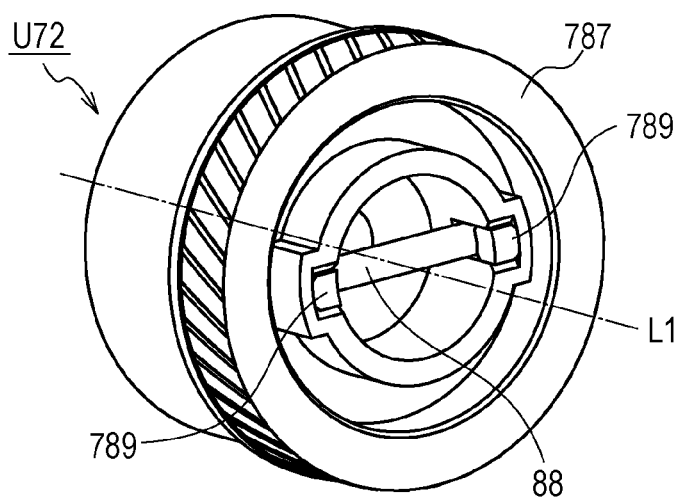
FIG. 18C is an explanatory view of the pin stopper structure.
Figure 19A:
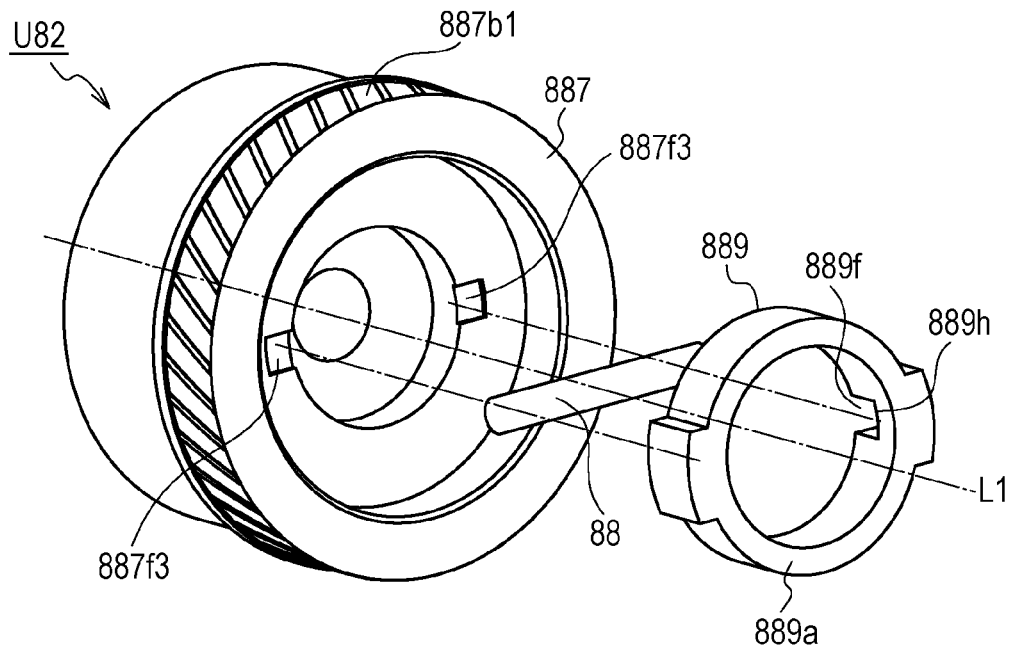
FIG. 19A is an explanatory view of a driving-side flange and an upper lid member.
Figure 19B:
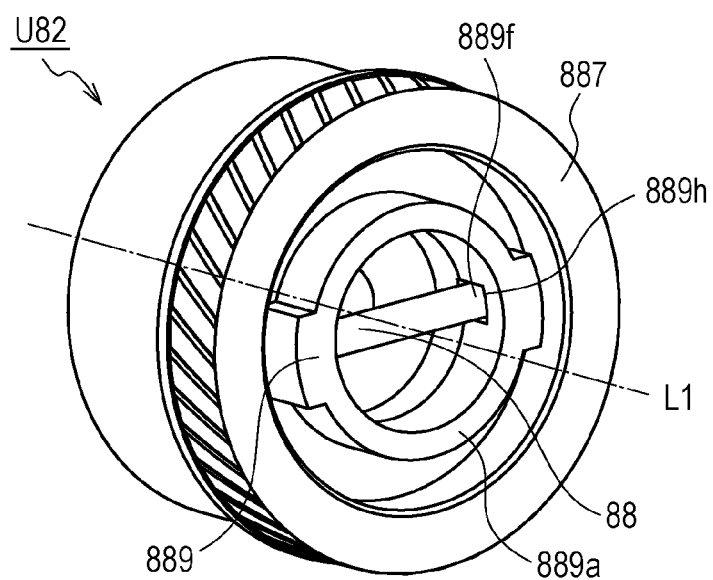
FIG. 19B is an explanatory view of the driving-side flange and the upper lid member.

Alternatively, slipping off of the pin 88 may be stopped by other method without deforming the protruding portion made of thermoplastic resin as in the present embodiment. Other stopper configurations of the pin 88 are described with reference to FIGS. 18A to 19B. FIGS. 18A to 18C are explanatory views of an exemplary stopper configuration of the pin 88. FIG. 18A is an exploded perspective view, and FIGS. 18B and 18C are perspective views of a state in which the pin 88 has been assembled. FIGS. 19A and 19B are explanatory views illustrating another exemplary configuration. FIG. 19A is an exploded perspective view, and FIG. 19B is a perspective view of a state in which the pin 88 has been assembled. As an exemplary stopper configuration of the pin 88, as illustrated in FIG. 18B, after inserting the pin 88 in the groove portion 787f of the driving-side flange 787 together with the coupling member 86 (not illustrated), an adhesive sealing agent H, such as hot melt or an adhesive, may be applied. Alternatively, as illustrated in FIG. 18C, a resin member 789 may be inserted and fixed by press-fitting, adhesion, welding, and the like. As illustrated in FIGS. 19A and 19B, a cylindrical portion 889a including a groove portion 889f and a stopper portion 889h may be formed in an upper lid member 889, and the upper lid member 889 may be fixed to the driving-side flange 887 having the bottom portion 887f3. The upper lid member 889 is a fixing member attached and fixed from the driving side (outer side of the photoconductive drum) to the driving-side flange 887. The upper lid member 889 is also a regulating member which regulates movement (slipping off) of the pin 88. The driving-side flange 787 has a gear portion 787b1 which is the same as the gear portion 87b1, and the driving-side flange 887 has a gear portion 887b1 which is the same as the gear portion 87b1.

Fourth Embodiment

Figure 20A:
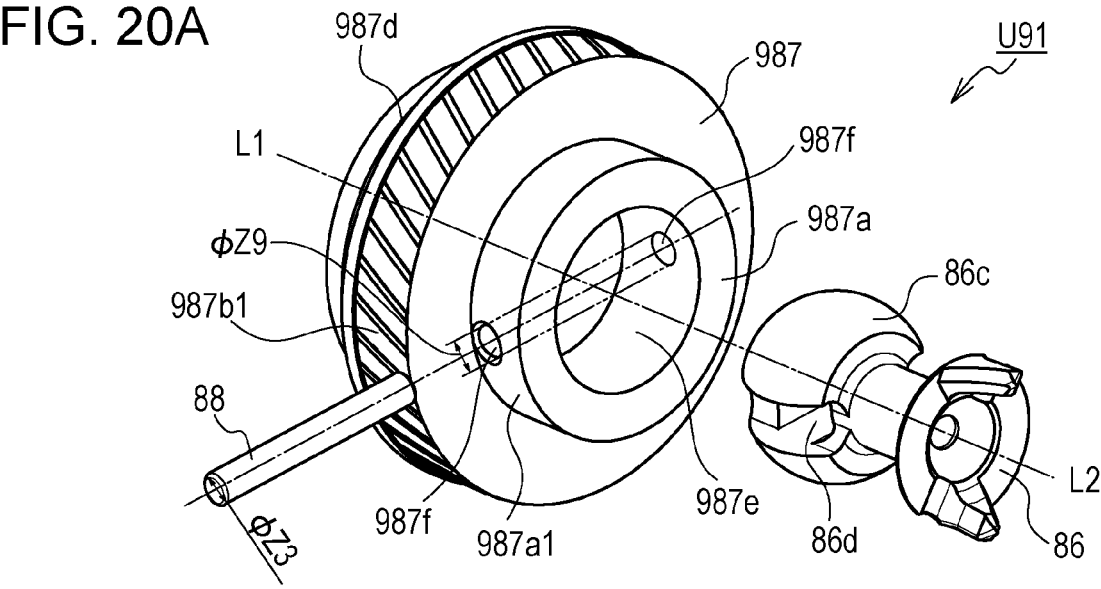
FIG. 20A is an explanatory view illustrating assembly of a drum unit.
Figure 20B:
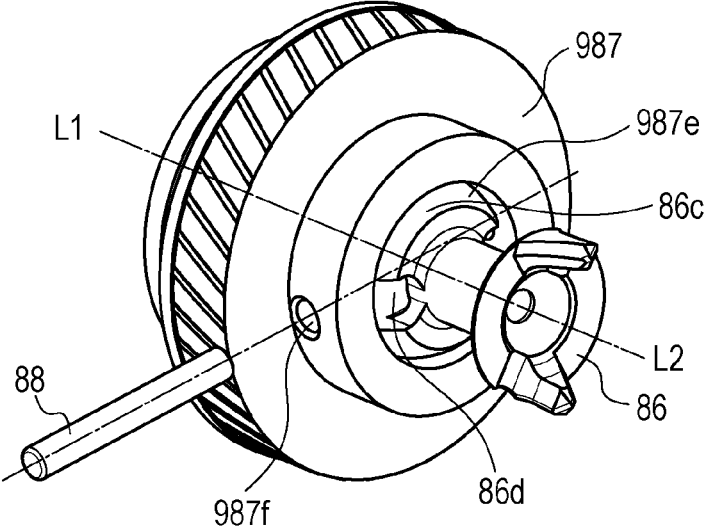
FIG. 20B is an explanatory view illustrating assembly of the drum unit.
Figure 20C:
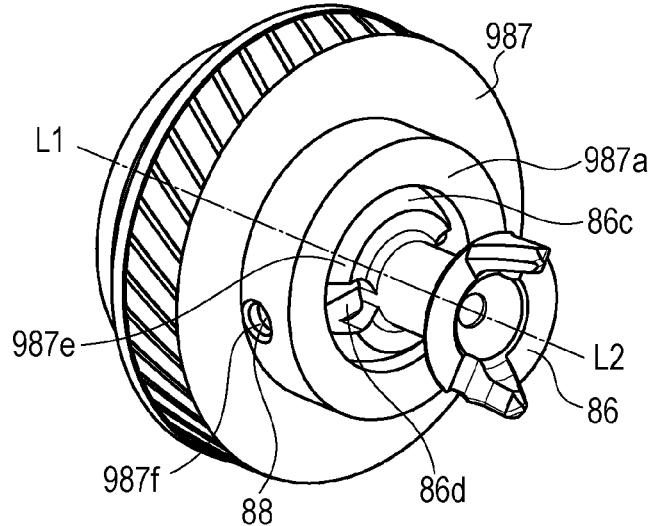
FIG. 20C is an explanatory view illustrating assembly of the drum unit.

A fourth embodiment of the present invention is described with reference to FIGS. 20A to 20C. FIGS. 20A to 20C are explanatory views of assembly of a drum unit U91 in the present embodiment. The assembly process is illustrated in the perspective views in the order of FIG. 20A to FIG. 20C. In the present embodiment, as illustrated in FIGS. 20A to 20C, since the shape of a driving-side flange 987 and the method for assembling the pin 88 are different from those of the above-described embodiments, description other than these will be omitted.

In the driving-side flange 987, as illustrated in FIG. 20A, a gear portion 987b1 and a cylindrical portion 987a are provided on the driving side of a fixing portion 987d for fixing the drum cylinder 62. The cylindrical portion 987a has a hollow portion 987e for supporting a connecting portion 86c of the coupling member 86 in the radial direction inner side as in the first embodiment. The cylindrical portion 987a has a through hole (a second through hole portion) 987f which penetrates from the hollow portion 987e to an outer peripheral surface 987a1, and which perpendicularly crosses the axis L1.

That is, each of the two through holes 987f penetrates an edge of the cylindrical portion 987a and communicates with the hollow portion 987e. The two through holes 987f are provided at 180 degrees from each other via the axis L1. That is, the two through holes 987f are located symmetrically about the axis L1 (which is the center of the cylindrical portion 987a).

A diameter φZ9 of each of the two through holes 987f is slightly smaller than the diameter φZ3 of the pin 88.

When assembling the coupling member 86 and the pin 88 to the driving-side flange 987, as illustrated in FIG. 20B, the connecting portion 86c of the coupling member 86 is first inserted in the hollow portion 987e. Then the pin 88 is inserted toward the hollow portion 987e from one of the through holes (the second through hole portion) 987f. As illustrated in FIG. 20C, the pin 88 is inserted to reach the through hole of the opposite side (the second through hole portion) 987f (not illustrated in FIG. 20C) via a through hole (a first through hole portion) 86d of the coupling member 86. Since the pin 88 is press-fit in the through hole 987f, slipping off of the pin 88 is stopped with respect to the driving-side flange 987. Assembly of the coupling member 86 and the pin 88 to the driving-side flange 987 is thus completed.

As described above, according to the present embodiment, the coupling member 86 can be assembled from the driving side of the drum cylinder unit U92. Therefore, assembly of the drum cylinder unit U92 becomes easier as in the first embodiment.

Although the pin 88 is fixed by press-fitting the pin 88 into the through hole 987*f* in the present embodiment, one of the through holes 987*f* may have a slightly large diameter and the pin 88 may be press-fit only into the other of the through holes 987*f*. Alternatively, any fixing methods other than press-fitting may be used. For example, the diameter of the through hole 987*f* may be set slightly greater than the diameter of the pin 88, and an adhesive may be applied to a gap between the pin 88 and the through hole 987*f* after the pin 88 is inserted in the through hole 987*f*. Further, any one of the pins 88 may be formed as a male screw at its end, and is inserted in one of the through holes 987*f* while tapping to fix the pin 88.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-047603, filed Mar. 10, 2015 and No. 2016-028430, filed Feb. 17, 2016, which are hereby incorporated by reference herein in their entirety.

The invention claimed is:

1. A drum unit usable in an electrophotographic image forming apparatus, the drum unit comprising:
    a photoconductive drum;
    a flange member;
    a coupling member including a through hole portion; and
    a pin penetrating the through hole portion and configured to transmit rotational force of the coupling member to the flange member, the pin having a longitudinal axis oriented in a longitudinal direction of the pin, wherein
    the flange member includes a fixing portion fixed to an end of the photoconductive drum, and a cylindrical portion which forms a hollow portion therein,
    the coupling member is connected to the flange member so that an inclination angle of the coupling member with respect to the longitudinal direction of the pin is variable and an inclination angle of the coupling member with respect to a rotational axis of the photosensitive drum is variable,
    the flange member includes elastic deformation portions which are provided opposed to each other with the rotational axis therebetween and which are not continuously connected with the cylindrical portion, the elastic deformation portions being provided with projections projecting toward the rotational axis, respectively, and
    a space between the projections is configured such that a width between the projections is smaller than a length of the pin measured in the longitudinal direction of the pin.

2. The drum unit according to claim 1, wherein the cylindrical portion includes a rotational force receiving portion contactable with the pin and receiving rotational force from the pin,
    wherein a space is present between the rotational force receiving portion and the elastic deformation portions.

3. The drum cylinder unit according to claim 1, wherein the cylindrical portion is a first cylindrical portion,
    the flange member further includes a second cylindrical portion provided outside of the cylindrical portion in a radial direction of the photoconductive drum, and a second groove portion provided between the first cylindrical portion and the second cylindrical portion, and
    the first cylindrical portion, the second cylindrical portion, and the second groove portion overlap in the axial direction of the photoconductive drum.

4. The drum cylinder unit according to claim 3, wherein the second cylindrical portion includes a gear portion.

* * * * *